US012629935B2

(12) United States Patent
Maeda et al.

(10) Patent No.: US 12,629,935 B2
(45) Date of Patent: May 19, 2026

(54) PRINTING DEVICE

(71) Applicant: BROTHER KOGYO KABUSHIKI KAISHA, Nagoya (JP)

(72) Inventors: Atsushi Maeda, Nagoya (JP); Shoko Ota, Nagoya (JP); Shuhei Hiwada, Toyoake (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 262 days.

(21) Appl. No.: 18/187,084

(22) Filed: Mar. 21, 2023

(65) Prior Publication Data

US 2023/0311490 A1 Oct. 5, 2023

(30) Foreign Application Priority Data

Apr. 1, 2022 (JP) ................................ 2022-061987

(51) Int. Cl.
*B41J 2/045* (2006.01)

(52) U.S. Cl.
CPC ....... *B41J 2/04573* (2013.01); *B41J 2/04546* (2013.01); *B41J 2/04581* (2013.01); *B41J 2/04588* (2013.01)

(58) Field of Classification Search
CPC ................ B41J 2/04581; B41J 2/04588; B41J 2/04541; B41J 2/04573; B41J 2/04546; B41J 2/04568; B41J 2/0459; B41J 29/38
See application file for complete search history.

(56) References Cited

U.S. PATENT DOCUMENTS

| | | | |
|---|---|---|---|
| 2007/0035573 | A1 | 2/2007 | Hoshi |
| 2008/0122888 | A1 | 5/2008 | Suzuki |
| 2019/0126611 | A1 | 5/2019 | Lahiri et al. |

FOREIGN PATENT DOCUMENTS

| | | | |
|---|---|---|---|
| JP | 58-53784 | Y2 | 12/1983 |
| JP | 2001-54947 | A | 2/2001 |
| JP | 2007-44957 | A | 2/2007 |
| JP | 2007-185804 | A | 7/2007 |
| JP | 2008-126612 | A | 6/2008 |
| JP | 2010-142978 | A | 7/2010 |
| JP | 2011-20330 | A | 2/2011 |
| JP | 2019-512413 | A | 5/2019 |
| JP | 2020-196172 | A | 12/2020 |

OTHER PUBLICATIONS

Notice of Reasons for Refusal issued in the corresponding Japanese Patent Application No. 2022-061987, Apr. 2, 2024.

*Primary Examiner* — Jannelle M Lebron
(74) *Attorney, Agent, or Firm* — Merchant & Gould P.C.

(57) ABSTRACT

A printing device comprises a nozzle configured to eject liquid by an energy generating element, and a signal generator configured to generate a time-division multiplexed signal where first data indicating a first drive waveform and second data indicating a second drive waveform are multiplexed transmittable through a single signal line. The time-division multiplexed signal included a first part and a second part of the first drive waveform, and a third part and a fourth part of the second drive waveform. The third part is arranged between the first part and the second part, and the second part is arranged between the third part and the fourth part. The printing device further comprises a separator configured to separate one of a first drive waveform signal indicating the first drive waveform and a second drive waveform signal indicating the second drive waveform from the time-division multiplexed signal.

25 Claims, 20 Drawing Sheets

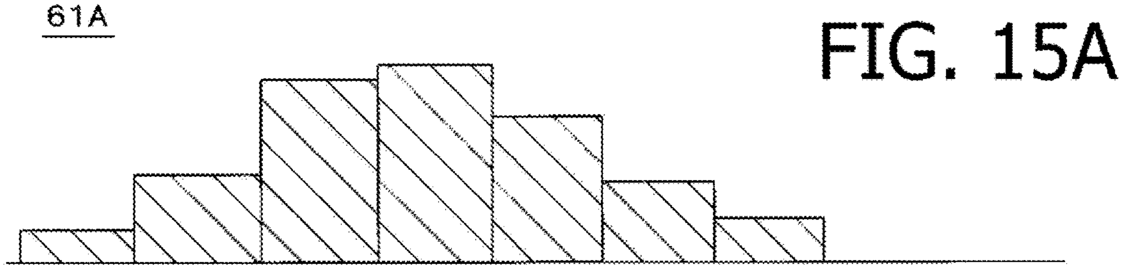
FIG. 15A
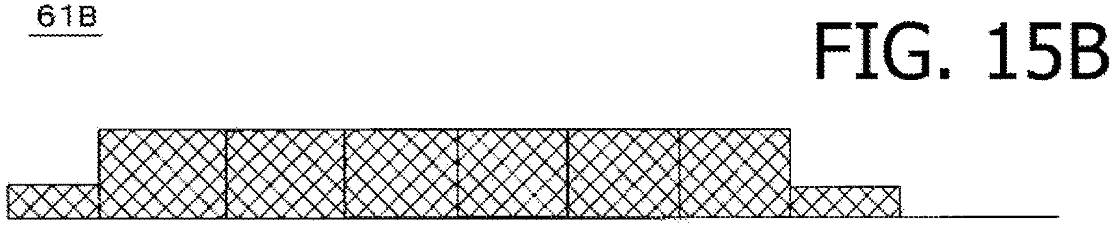
FIG. 15B
FIG. 15C
TIME-DIVISION SIGNAL S4a
FIG. 15D
FIG. 15E
TIME-DIVISION SIGNAL S4b
FIG. 15F
TIME-DIVISION SIGNAL S4c
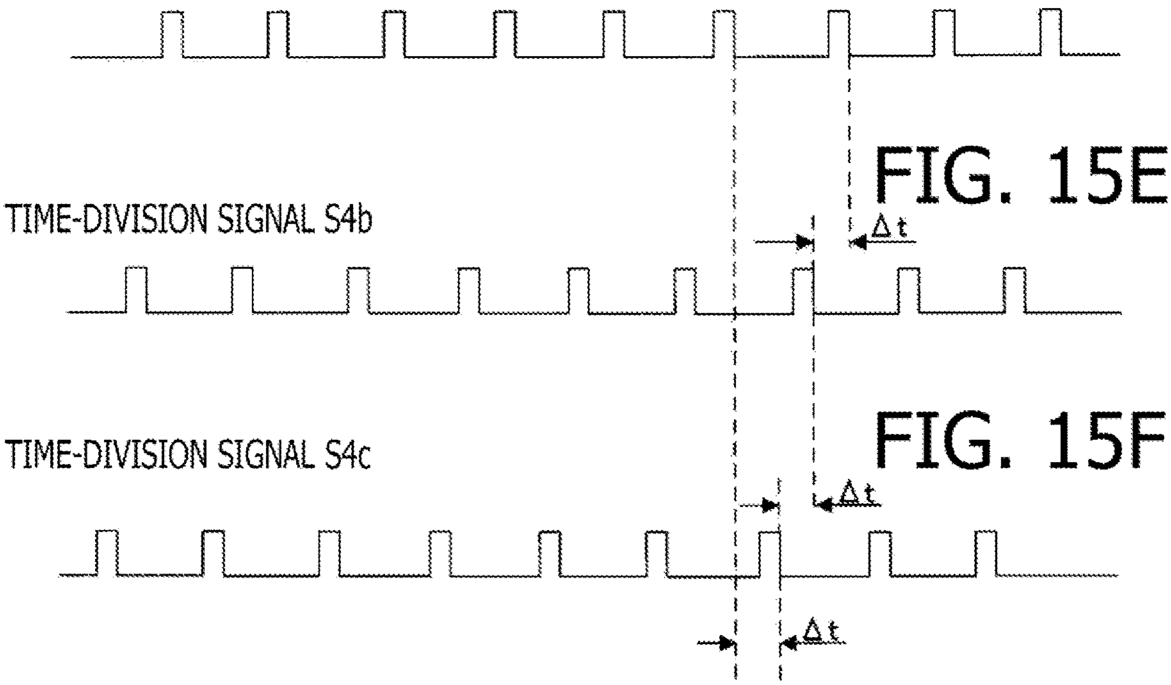

CASE WHERE THE NUMBER OF NOZZLES DRIVEN IS CONSTANT AND AMPLITUDES OF DRIVE WAVEFORM SIGNALS VARY OVER TIME
FIG. 20A
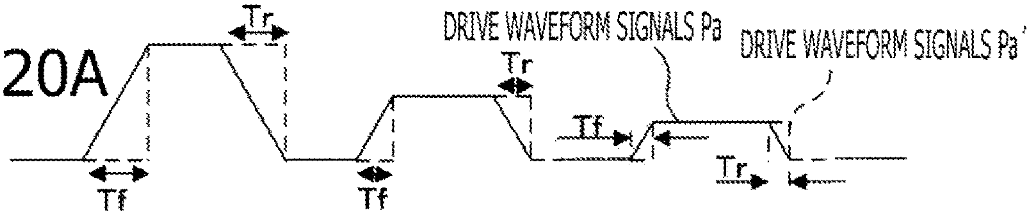
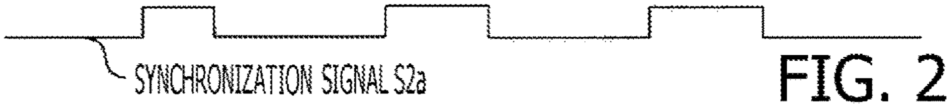
FIG. 20B
CASE WHERE THE NUMBER OF NOZZLES DRIVEN CHANGES OVER TIME AND AMPLITUDES OF DRIVE WAVEFORM SIGNALS ARE CONSTANT
FIG. 20C
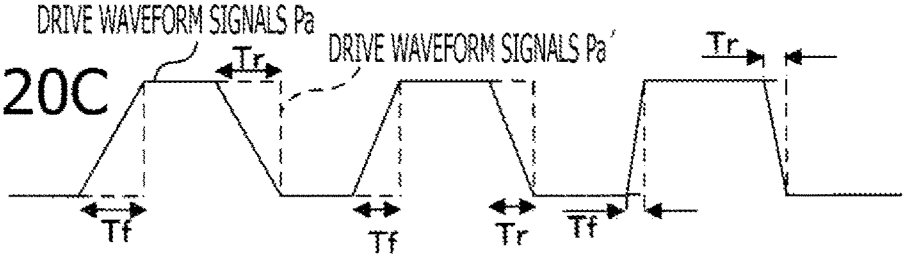
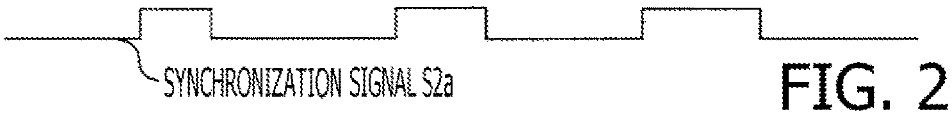
FIG. 20D
CASE WHERE THE NUMBER OF NOZZLES DRIVEN CHANGES OVER TIME AND AND AMPLITUDES OF THE DRIVE WAVEFORM SIGNALS ARE CONSTANT
FIG. 20E
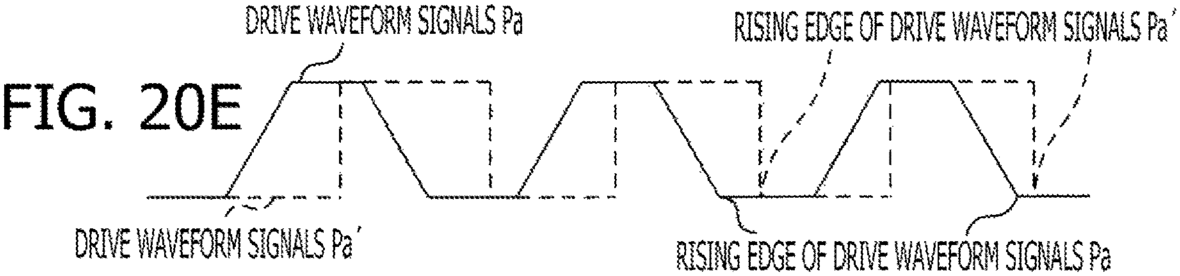
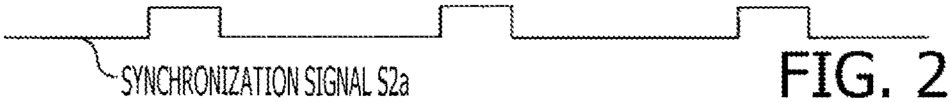
FIG. 20F

PRINTING DEVICE

REFERENCE TO RELATED APPLICATIONS

This application claims priority from Japanese Patent Application No. 2022-061987 filed on Apr. 1, 2022. The entire content of the priority application is incorporated herein by reference.

BACKGROUND ART

The present disclosures relate to a printing device configured to eject ink.

There has been known a printer configured to generate first-fourth driving pulses respectively having different amplitudes for driving piezo elements provided to nozzles of the printer. Such a printer is typically configured such that the first-fourth driving pulses are sequentially generated during one period to print one pixel. Specifically, one of the first-fourth driving pulses is selected and applied to the piezo element of each nozzle. Then, the nozzle ejects ink of which amount corresponds to the amplitude of the selected driving pulse, thereby a dot having a desired size being formed.

DESCRIPTION

According to the above-describe conventional printer, four driving pulses are sequentially generated during one period, only one driving pulse is selected. Therefore, time periods corresponding to the unselected three driving pulses serve as a standby time of the nozzle.

The present disclosures are advantageous in that such a standby time of the nozzle can be reduced by adjusting the amplitude of a drive waveform applied to an energy-applying element such as the piezo element.

According to aspects of the present disclosures, there is provided a printing device comprising a nozzle configured to eject liquid by an energy generating element, a signal generator configured to generate a time-division multiplexed signal where first data indicating a first drive waveform and second data indicating a second drive waveform are multiplexed, the first data and the second data being transmittable by the time-division multiplexed signal through a single signal line, the time-division multiplexed signal being generated based on at least the first data and the second data, the time-division multiplexed signal including a first part of the first drive waveform, a second part of the first drive waveform, a third part of the second drive waveform and a fourth part of the second drive waveform, the third part being arranged between the first part and the second part, the second part being arranged between the third part and the fourth part, and a separator configured to separate one of a first drive waveform signal indicating the first drive waveform and a second drive waveform signal indicating the second drive waveform from the time-division multiplexed signal. The energy generating element is configured to be driven by one of a first separated waveform signal and a second separated waveform signal, the first separated waveform signal being a signal separated by the separator by a first pulse signal having a period shorter than a period of the first part and a second pulse signal having a period shorter than a period of the second part, the second separated waveform signal being a signal separated by the separator by a third pulse signal having a period shorter than a period of the third part and a fourth pulse signal having a period shorter than a period of the fourth part.

FIGS. 15A-15F illustrate a relationship between analog signals and time-division signals.

FIGS. 20A-20F show ideal drive waveform signals, delay-included drive waveform signals, and synchronization signals.

Figure 1:
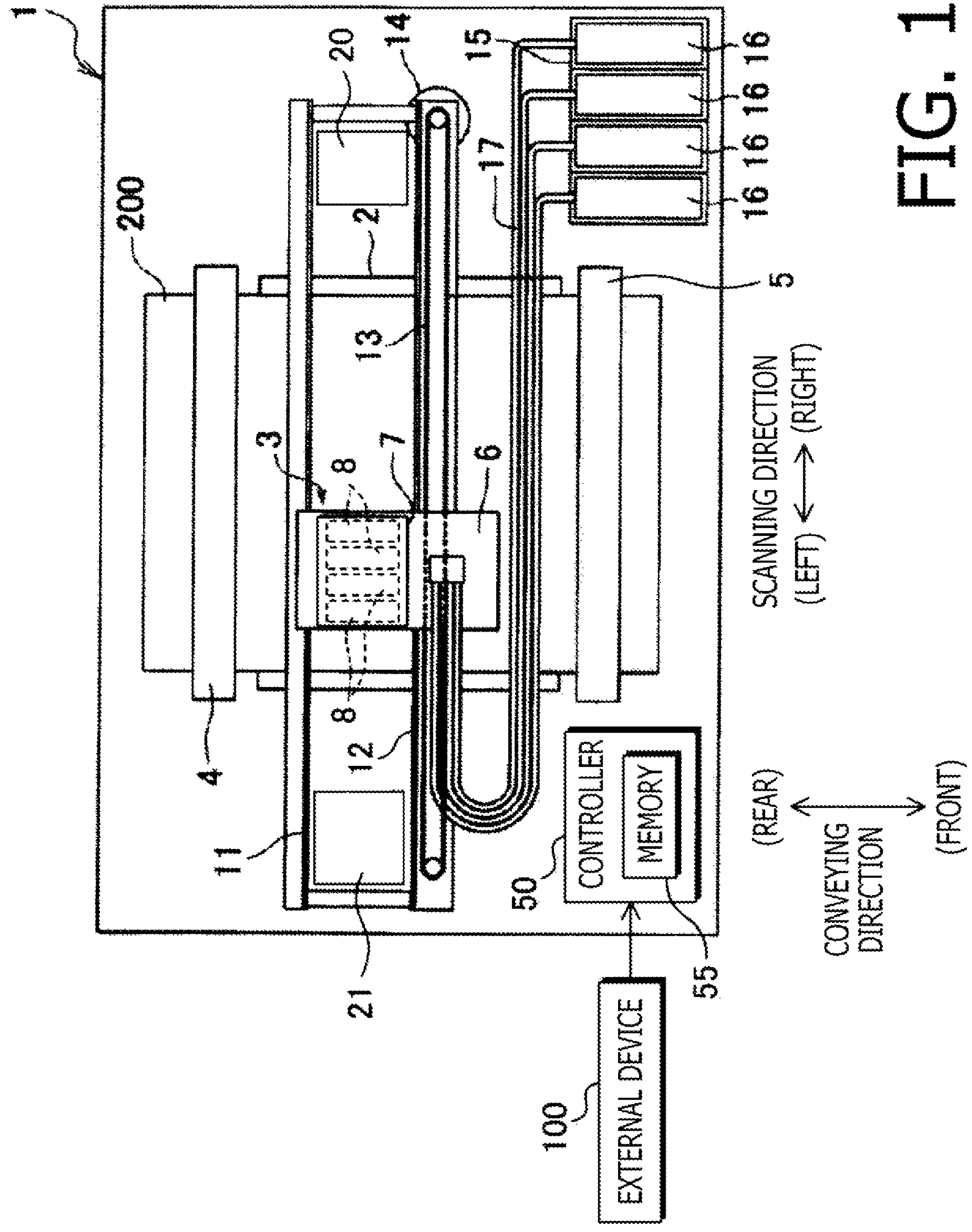
FIG. 1 is a plan view of a printing device according to an embodiment of the present disclosures.

Hereinafter, a printing device 1 according to an embodiment of the present disclosures will be described with reference to the drawings. FIG. 1 is a plan view schematically shows the printing device 1. In the following description, directions as shown in FIG. 1 will be referred to for indicating directions (i.e., front, rear, right and left directions). The front-rear direction corresponds to a sheet feed direction, and the right-left direction corresponds to a scanning direction. Further, a closer direction with respect to the plane of FIG. 1 corresponds to an up side of the printing device 1, and a farther side with respect to the plane of FIG. 1 corresponds to a bottom side of the printing device 1.

As shown in FIG. 1, the printing device 1 has a platen 2, an ink ejection device 3, and conveying rollers 4 and 5. On an upper surface of the platen 2, printing sheet 200, which is a printing medium, is placed. The ink ejection device 3 ejects the ink (i.e., ink droplets) on the printing sheet 200 placed on the platen 2 to print an image. The ink ejection device 3 has a carriage 6, a sub tank 7, four inkjet heads 8, and a circulation pump 10.

On the upper side of the platen 2, two guide rails 11 and 12 extending in the right-left direction are provided to guide the carriage 6. The carriage 6 is connected with an endless belt 13 that extends in the right-left direction. The endless belt 13 is driven, by the carriage driving motor 14, to move. As the endless belt 13 moves, the carriage 6 is guided by the guide rails 11 and 12, and is moved reciprocally in the scanning direction within an area facing the platen. More concretely, with supporting the four inkjet heads 8, the carriage 6 performs a first movement to move the inkjet head 8, in the scanning direction, from left to right, from a certain position to another position, and a second movement to move the inkjet head 8, in the scanning direction, from right to left, from a certain position to another position.

Between the guide rails 11 and 12, a cap 20 and flushing receiver 21 are provided. The cap 20 and the flushing receiver 21 are arranged on a lower side with respect to the ink ejection device 3. The cap 20 are arranged on a right end portion of the guide rails 11 and 12, while the flushing receiver 21 is arranged on a left end portion of the guide rails 11 and 12. It is noted that the cap 20 and flushing receiver 21 may be arranged reversely on the left and right.

The sub tank 7 and the four inkjet heads 8 are mounted on the carriage 6, and are moved, together with the carriage 6, reciprocally in the scanning direction. The sub tank 7 is connected to a cartridge holder 15 via a tube 17. To the cartridge holder 15, ink cartridges 16 of one or multiple colors (four colors, in the present embodiment) are mounted. The four colors are, for example, black, yellow, cyan, and magenta.

Inside the sub tank 7, for ink chambers are formed. In the four ink chambers, four colors of ink supplied by the four ink cartridges 16 are reserved, respectively.

The four inkjet heads 8 are arranged below the sub tank 7 in the scanning direction. On a lower surface of each inkjet head 8, multiple nozzles 80 (see FIG. 2) are formed. One inkjet head 8 corresponds to one color of ink and is connected to one ink chamber. In other words, the four inkjet heads 8 correspond to four colors of ink and are connected to the four ink chambers, respectively.

Each inkjet head 8 is provided with an ink inlet and an ink outlet. The ink inlet and the ink outlet are connected to the corresponding ink chamber via tubes. Between each ink inlet and the corresponding ink chamber, a circulation pump is interposed.

The ink sent from the ink chamber by the circulation pump flows into the inkjet heads 8 through the ink inlet and is ejected from the nozzles 80. The ink that is not ejected from the nozzles 80 returns to the inkjet head 8 through the ink inlet. The ink circulates between the ink chambers and the inkjet heads 8. The four inkjet heads 8 eject the four colors of ink toward the printing sheet 200 supplied from the sub tank 7, moving together with the carriage 6 in the scanning direction.

As shown in FIG. 1, the conveying roller 4 is arranged on an upstream side (i.e., the rear side), in the conveying direction, with respect to the platen 2. The conveying roller 5 is arranged on a downstream side (i.e., the front side), in the conveying direction, with respect to the platen 2. The two conveying rollers 4 and 5 are driven by a motor in a synchronized manner. The two conveying rollers 4 and 5 convey the printing sheet 200 placed on the platen 2 in the conveying direction that is orthogonal to the scanning direction. The printing device 1 has a controller 50. The controller 50 includes a CPU or a logic circuit (e.g., an FPGA (field-programmable gate array)), a non-volatile memory, and a memory 55 such as a RAM. The controller 50 receives a print job and drive waveform data from an external device 100 and stores the same in the memory 55. The memory is an example of a storage. The controller 50 controls, based on the print job, driving of the ink ejection device 3 and the conveying roller 4 to perform a printing process.

Figure 2:
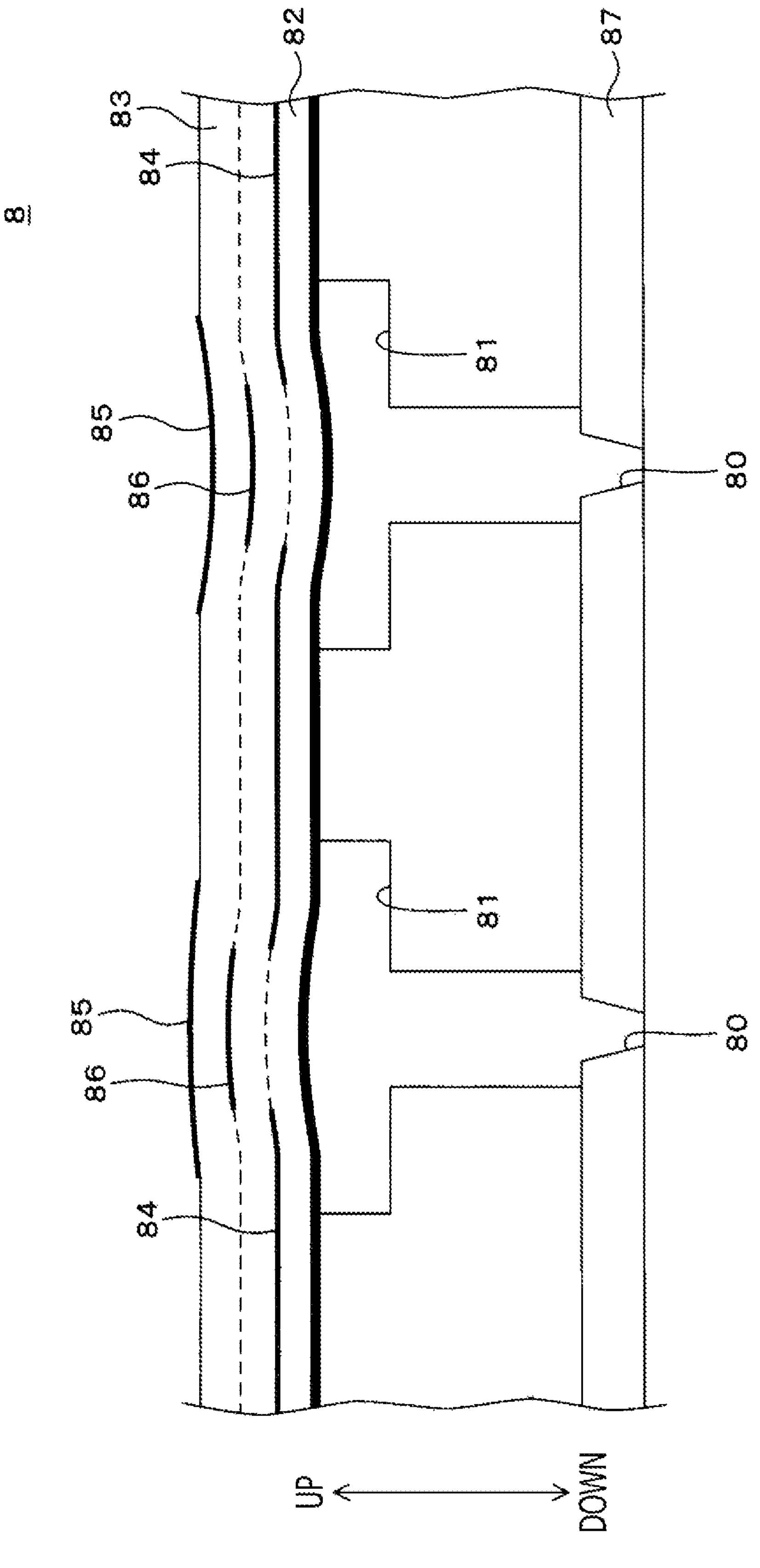
FIG. 2 is a partially enlarged cross-sectional view of an inkjet head.

FIG. 2 is a partially enlarged cross-sectional view of the inkjet head 8. The inkjet head 8 has multiple pressure chamber 81. The multiple pressure chambers 81 constitute multiple pressure chamber arrays. On an upper side with respect to each pressure chamber 81, a vibrating plate 82 is formed, and a layered piezoelectric body 83 is formed on an upper side with respect to the vibrating plate 82. On the upper side with respect to each pressure chamber 81, and between the piezoelectric body 83 and the vibrating plate 82, a first common electrode 84 is formed 84. The piezoelectric body 83 is an example of an energy generating element according to aspects of the present disclosures.

Inside the piezoelectric body 83, a second common electrode 86 is provided. The second common electrode 86 is arranged on an upper side with respect to each pressure chamber 81 and on an upper side with respect to the first common electrode 84. The common electrode 86 is arranged at a position that does not face the first common electrode 84. On an upper side of each pressure chamber 81, and on an upper surface of the piezoelectric body 83, an individual electrode 85 is formed. The individual electrode 85 is arranged opposite, in the up-down direction, to the first common electrode 84 and the second common electrode 86 with the piezoelectric body 83 sandwiched therebetween. The vibrating plate 82, the piezoelectric body 83, the first common electrode 84, the individual electrode 85 and the second common electrode 86 constitute an actuator 88.

On a lower part of each pressure chamber 81, a nozzle plate 87 is provided. On the nozzle plate 87, multiple nozzles 80, each of which penetrates through the nozzle plate 87 in the up-down direction, are formed. The nozzles 80 are arranged on the bottom surface of each pressure. The multiple nozzles constitute multiple nozzle arrays, each of which extends along the pressure chamber array.

The first common electrode 84 is connected to a com terminal (in the present embodiment, the ground), and the second common electrode 86 is connected to a VCOM terminal. It is noted that a VCOM voltage is higher than a COM voltage. The individual electrode 85 is connected to a switch group 54 (see FIG. 3). The individual electrode 85 is applied with a High voltage or Low voltage, thereby the piezoelectric body 83 deforming to vibrate the vibrating plate 82. As the vibrating plate 82 vibrates, the ink is ejected from the pressure chamber 81 through the nozzles 80.

Figure 3:
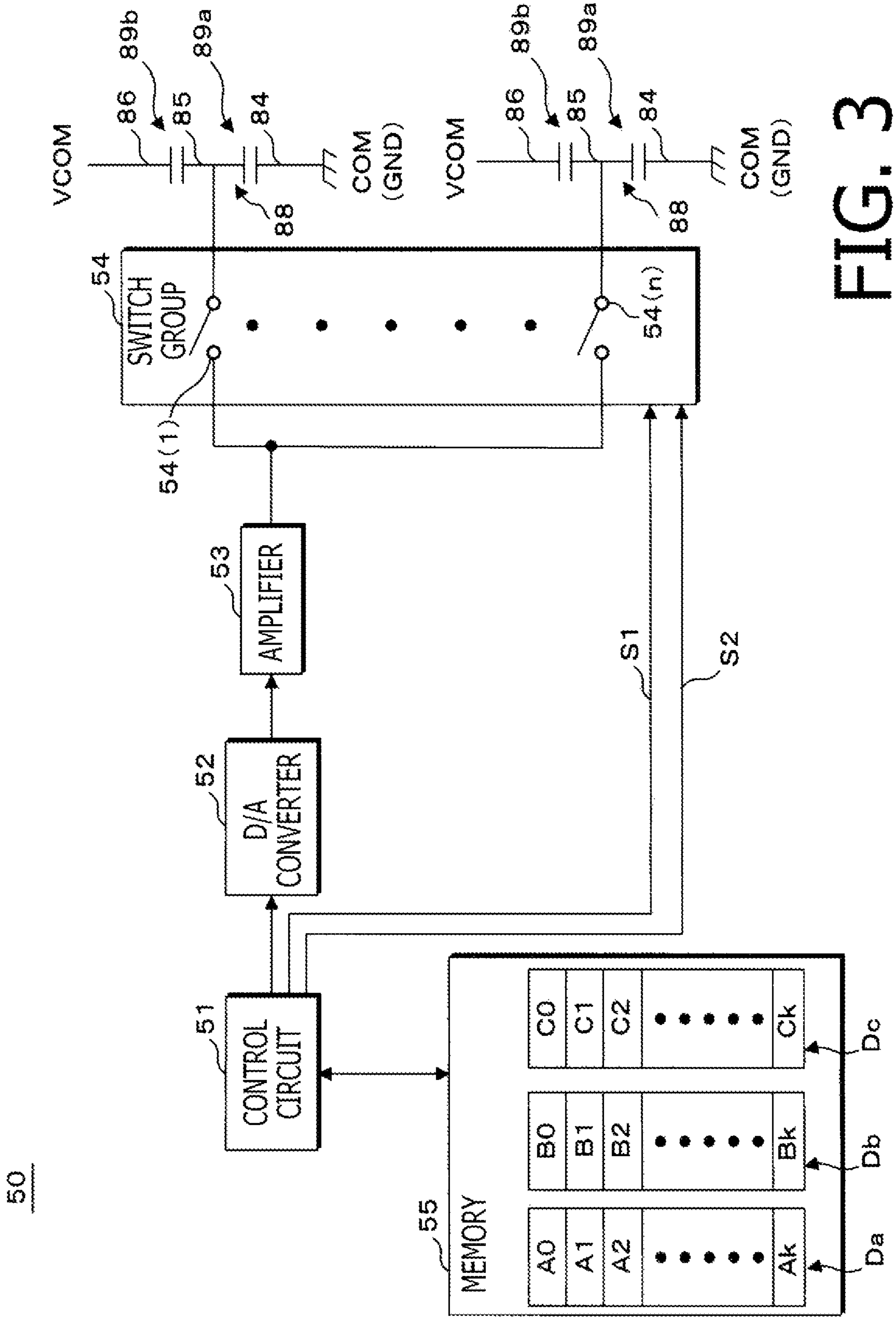
FIG. 3 is a block diagram of a controller of the printing device.

FIG. 3 is a block diagram of the controller 50. The controller 50 includes a control circuit 51, a D/A converter 52, an amplifier 53, a switch group 54 and a memory 55. The memory stores the drive waveform data. The drive waveform data is quantized data indicating a voltage waveform applied to the individual electrode 85, that is, data indicating the drive waveform to drive the actuator 88. In the present embodiment, drive waveform data Da, Db and Dc are stored in the memory 55.

The D/A converter 52 converts a digital signal to an analog signal. The amplifier 53 amplifies the analog signal. The switch group 54 includes multiple n-th switches 54($n$), (n=1, 2, . . . ). The n-th switch 54($n$) is configured by, for example, an analog switch IC. One ends of the multiple n-th switches 54($n$) are connected to the amplifier 53 through a common bus. The other ends of the multiple n-th switches 54($n$) are connected to respective individual electrode 85 corresponding to the multiple nozzles 80, respectively. The control circuit 51 transmits a selection signal S1 to select any of the switches 54($n$) and a synchronization signal S2 to the switch group 54. The synchronization signal S2 contains synchronization signals S2*a*, S2*b* and S2*c*, which will be described later. The control circuit 51 transmits the selection signal S1 in association with, for example, one of the synchronization signals S2*a*, S2*b* and S2*c*.

The individual electrode 85, the first common electrode 84 and the piezoelectric body 83 constitute a first condenser

89*a*. Further, the individual electrode 85, the second common electrode 86 and the piezoelectric body 83 constitute a second condenser 89*b*.

Figure 4A:
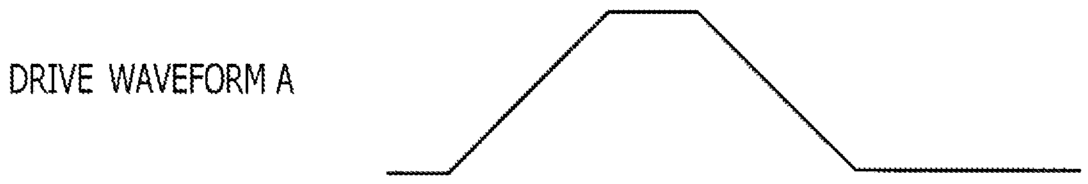
FIGS. 4A, 4B and 4C show examples of drive waveform.
Figure 4B:
Figure 4C:
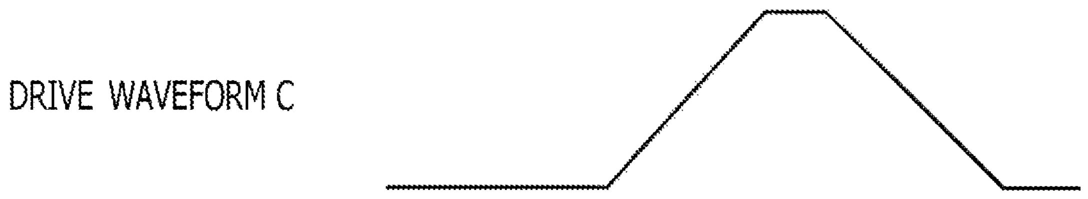

FIGS. 4A-4C show an example of drive waveforms A, B and C, respectively. The drive waveforms A, B and C deforms the piezoelectric body 83. As the piezoelectric body 83 is deformed, the vibrating plate 82 vibrates. Then, by the vibration of the vibrating plate 82, the ink in the pressure chamber 81 is caused to pass through a descender, and ejected through the nozzle 80. For example, the drive waveform A is for ejecting a large-size droplet, and the drive waveform B is for ejecting a medium-size droplet. The drive waveform C is also for ejecting a large-sized droplet, but the drive waveforms A and C have different ejection timings.

In each of FIGS. 4A-4C, a right-hand side portion of the waveform represents a state earlier in time than a left-hand side portion. The same applies to FIGS. 5A-5C, 6A-6D, 7A-7C, 15A-15F, 18A-18D, 19A-19D, and 20A-20F. The waveform data Da is the quantized data of the drive waveform A, the waveform data Db is the quantized data of the drive waveform B, and the waveform data Dc is the quantized data of the drive waveform C. The drive waveform data Da includes quantized data Ak (k=0, 1, 2, . . . ), the drive waveform data Db includes quantized data Bk (k=0, 1, 2, . . . ) and the drive waveform data Dc includes quantized waveform data Ck (k=0, 1, 2, . . . ).

Figure 5A:
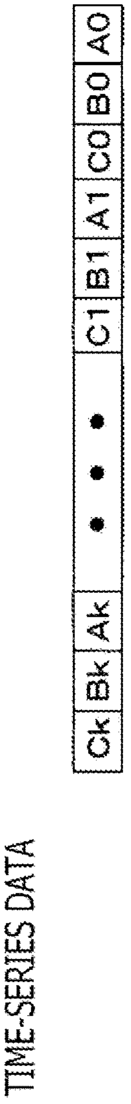
FIGS. 5A, 5B and 5C illustrate a data configuration of time-series data, an analog signal and a time-division multiplexed signal, respectively.
Figure 5B:
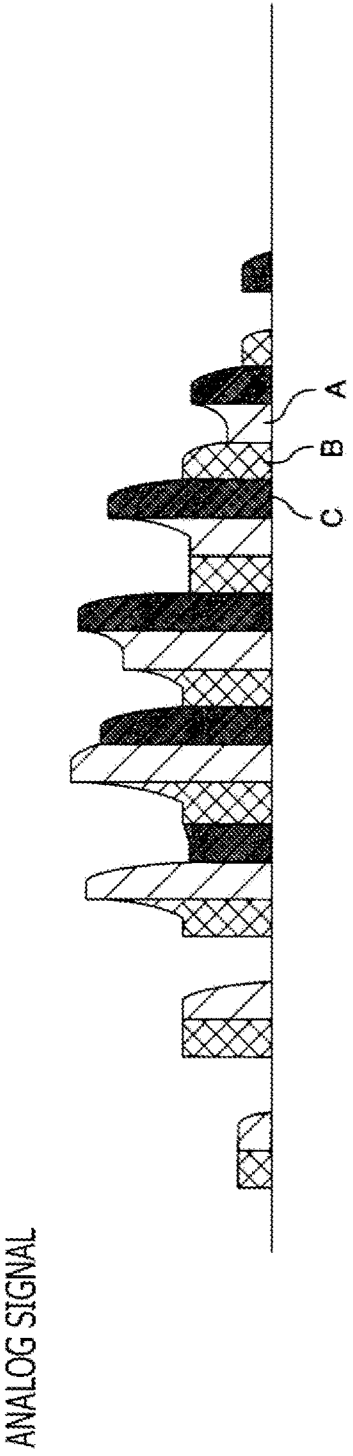
Figure 5C:
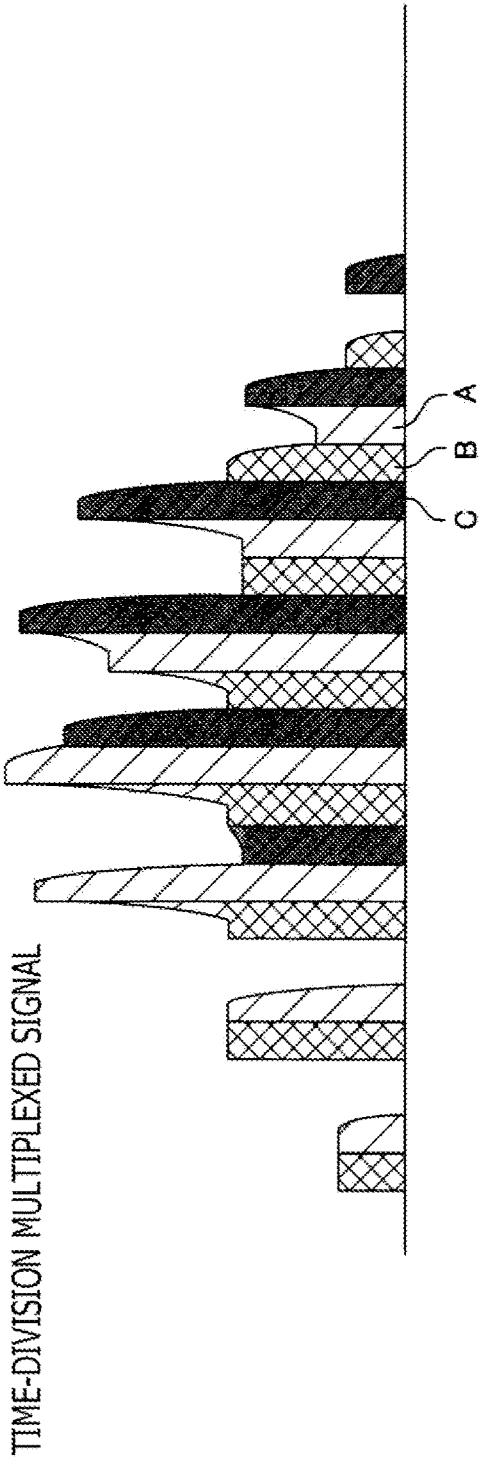

FIGS. 5A-5C show an example of time-series data, an analog signal and a time-division multiplexed signal. In FIGS. 5B and 5C, portions indicated by "A," "B," and "C" corresponds to the drive waveforms A, B and C, respectively. When driving the actuator 88, the control circuit 51 access the memory 55 to obtain the drive waveform data Da, Db and DC, and generates time-series data. The time-series data is data composed of data Ak, Bk, and Ck, arranged in order (i.e., A0, B0, C0, A1, B1, C1, . . . , Ak, Bk, Ck) with a time interval Δt. The time-series data is a digital signal. The time interval Δt is an inverse of a particular sampling frequency. The quantized data Ak, Bk, and Ck are arranged in the order A0, B0, C0, A1, B1, C1, . . . , Ak, Bk, Ck, at intervals of time corresponding to the inverse of the particular sampling frequency. In other words, the data length of the quantized data Ak, Bk, and Ck is less than or equal to the length corresponding to the inverse of the particular sampling frequency.

The quantized data A0 is continuous with the quantized data B0, the quantized data B0 is continuous with the quantized data C0, and the quantized data C0 is continuous with the quantized data A1. Therefore, there is no quantized data C0, other quantized data or other waveform data between the quantized data A0 and the quantized data B0. Further, there is no quantized data A0, other quantized data or other waveform data between the quantized data B0 and the quantized data C0. Furthermore, there is no quantized data B0, other quantized data or other waveform data between the quantized data C0 and the quantized data A1. It is noted that the sampling frequency is 24 MHz, and the data length of the quantized data Ak, Bk, and Ck is about 41 ns.

The control circuit 51 outputs the time-series data to the D/A converter 52. As shown in FIG. 5B, the D/A converter 52 converts the time-series data to an analog signal and outputs the analog signal to the amplifier 53. The amplifier 53 amplifies the input analog signal, and outputs the amplified signal to the switch group 54. As shown in FIG. 5C, the analog signal amplified by the amplifier 53 constitutes the time-division multiplexed signal.

In other words, the time-division multiplexed signal is not an analog signal corresponding only to data Ak, an analog signal corresponding only to data Bk, or an analog signal corresponding only to data Ck. Further, the time-division multiplexed signal is configured in such a manner that at least an analog signal corresponding to a group of three pieces of data including one piece of data Ak, one piece of data Bk, and one piece of data Ck, and an analog signal corresponding to a group of three pieces of data including one piece of data A(k+1), one piece of data B(k+1), and one piece of data C(k+1), and are consecutive in time series.

For example, in FIGS. 5A-5C, there is only one time-division multiplexed signal. In FIGS. 5A-5C, the analog signal corresponding to data C0 appears to be isolated. However, it is because an analog signal corresponding to a group of three pieces of data including data A0, data B0 and data C0, with data A0 and data B0 being zero, is consecutive in time series to an analog signal corresponding to a group of three pieces of data including data A1, data B1 and data C1, with data A1 being zero. Further, an analog signal corresponding to a group of data Ak and data Bk appears to be isolated. However, it is because an analog signal corresponding to a group of three pieces of data including data A(k−1), data B(k−1) and data C(k−1), with data C(k−1) being zero, is consecutive in time series to an analog signal corresponding to a group of three pieces of data including data Ak, data Bk and data Ck. For the same reason, an analog signal corresponding to a group of data A(k−1) and data B(k−1) appears to be isolated. Therefore, the analog signal shown in FIG. 5B is treated as one time-division multiplexed signal.

In a time-division multiplexed signal, when the portion corresponding to data Ak−1 is indicated as the first part, the portion corresponding to data Ak is indicated as the second part, the portion corresponding to data Bk−1 is indicated as the third part, and the portion corresponding to data Bk is indicated as the fourth part, the third part is arranged between the first part and the second part, and the second part is arranged between the third part and the fourth part. In other words, the first and third parts are continuous, the third part and the second part are continuous, and the second part and the fourth part are continuous. That is, in the time-division multiplexed signal, there is no second part, fourth part, or other waveforms between the first and third parts.

In the time-division multiplexed signal, there is no first part, fourth part and other waveforms between the third part and the second part. Furthermore, in the time-division multiplexed signal, there is no first part, third part, or other waveforms between the second and fourth parts. There are similar relationships are between data Ak and Ck, and there are similar relationships between data Bk and Ck. The control circuit 51, the D/A converter 52, the amplifier 53, and the memory 55 constitute a signal generator. One time-division multiplexed signal is contained within one ejection drive period. For example, when the ejection drive frequency (ejection frequency) is 100 kHz, one ejection drive period (ejection period) is 10 μs, and one time-division multiplexed signal is less than 10 μs in length. It is preferable that there are at least three pieces of data Ak, three pieces of data Bk and three pieces of data Ck in a single time-division multiplexed signal. The reason will be described later.

In FIG. 5B, analog signals corresponding to data C, B and A are represented. For example, the analog signal corresponding to data C(k−4) is AS(C(k−4)), the analog signal corresponding to data A(k−3) is AS(A(k−3)), the analog signal corresponding to data B(k−3) is AS(B(k−3)), and the analog signal corresponding to data C(k−3) is AS(C(k−3)). The value of data A(k−3) is greater than data C(k−4). The value of data B(k−3) is less than data A(k−3). The value of data Cp is greater than data Bp.

The value of AS(A(k−3)) reaches from the value of AS(C(k−4)) to the value of data A(k−3) after a particular time has elapsed. The value of AS(B(k−3)) reaches from the value of AS(A(k−3)) to the value of data B(k−3) after a particular time has elapsed. The value of AS(Ck−3) reaches from the value of AS(B(k−3)) to the value of data C(k−3) after a particular time has elapsed. That is, the analog signal reaches the value of the digital signal after elapse of a particular delay time from the point at which the conversion from a digital signal to an analog signal begins. These characteristics are the same for the time-division multiplexed signal 94 which is an amplified analog signal, as shown in the bottom-most FIG. 5C.

Figures 6A, 6B, 6C, 6D:
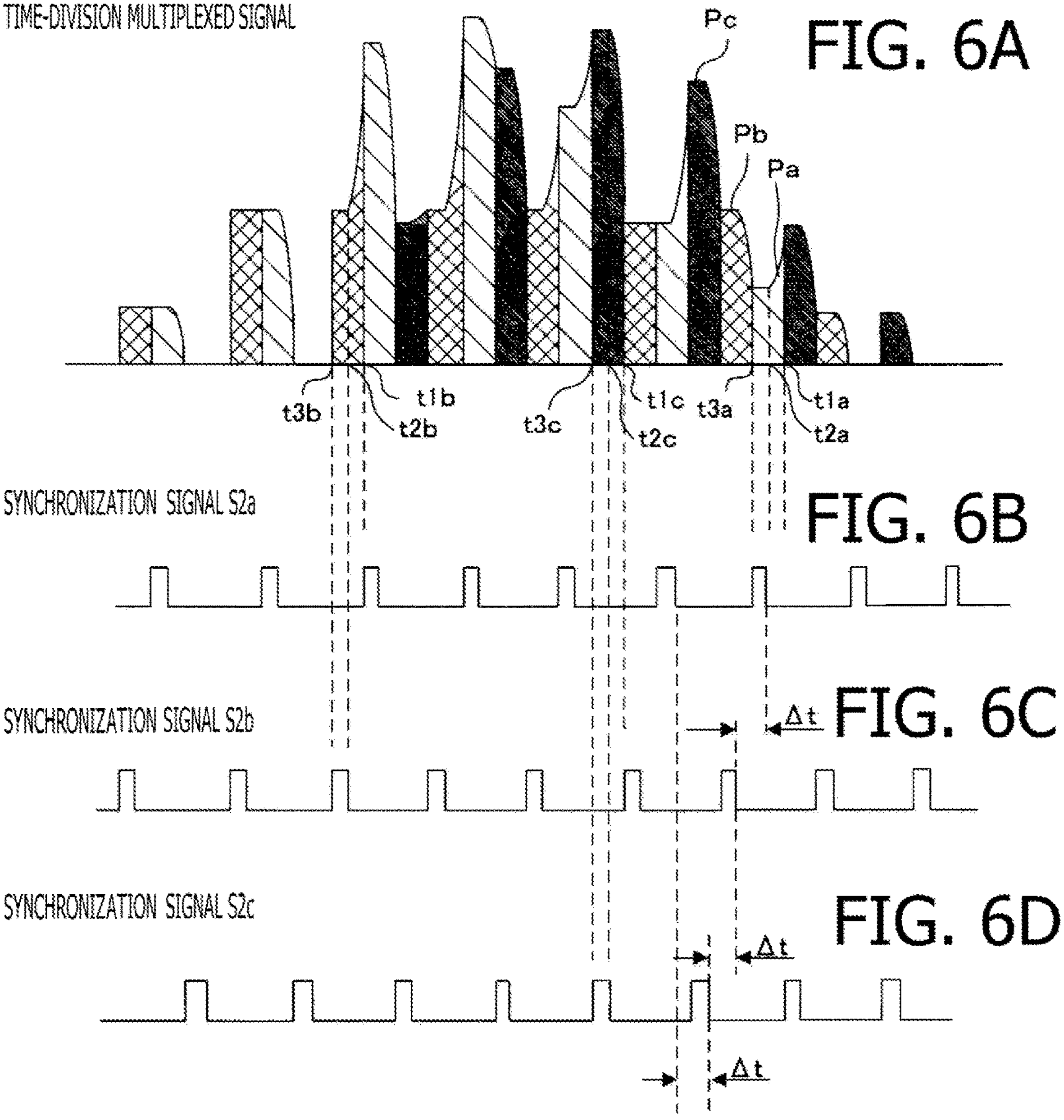
FIGS. 6A, 6B, 6C and 6D illustrate a relationship among the time-division multiplexed signal and synchronization signals.

FIGS. 6A-6D illustrate a relationship between the time-division multiplexed signal and the synchronization signals S2*a*, S2*b*, and S2*c*. The synchronization signals S2*a*, S2*b* and S2*c* are pulse waves. In FIG. 6A, t1*a* indicates the start point of the ON state of the drive waveform signal Pa, which indicates drive waveform A, t2*a* indicates the point when the drive waveform signal Pa reaches the target value, and t3*a* indicates the end point of the ON state of the drive waveform signal Pa. Further, t1*b* indicates the start point of the ON state of the drive waveform signal Pb, which indicates drive waveform B, t2*b* indicates the point when the drive waveform signal Pb reaches the target value, and t3*b* indicates the end point of the ON state of the drive waveform signal Pb. Further, t1*c* indicates the start point of the ON state of the drive waveform signal Pc, which indicates drive waveform C, t2*c* indicates the point when the drive waveform signal Pc reaches the target value, and t3*c* indicates the end point of the ON state of the drive waveform signal Pc. In FIG. 6A, the drive waveform signals in the position corresponding to the synchronization signal S2*a*, other than the drive waveform signal Pa, are drive waveform signals indicating drive waveform A, as with the drive waveform signal Pa, and have t1*a*, t2*a* and t3*a*. Further, the drive waveform signals in the position corresponding to the synchronization signal S2*b*, other than the drive waveform signal Pb, are drive waveform signals indicating drive waveform B, similar to the drive waveform signal Pb, and have t1*b*, t2*b*, and t3*b*. Furthermore, the drive waveform signals in the position corresponding to the synchronization signal S2*c*, other than the drive waveform signal Pc, are drive waveform signals indicating the drive waveform C, similar to the drive waveform signal Pc, and have t1*c*, t2*c*, and t3*c*.

A time between t1*a* and t2*a*, a time between t1*b* and t2*b*, and a time between t1*c* and t2*c* are so-called transient response times, which are delay times td, respectively. The delay time td has been stored in the memory in advance. The time point t2*a* is a rising edge (i.e., ON point) of the pulse of the synchronization signal S2*a*. The time point t2*b* is a rising edge (i.e., ON point) of the pulse of the synchronization signal S2*b*. The time point t2*c* is a rising edge (i.e., ON point) of the pulse of the synchronization signal S2*c*. The time point t3*a* is a falling edge (i.e., OFF point) of the pulse of the synchronization signal S2*a*. The time point t3*b* is a falling edge (i.e., OFF point) of the pulse of the synchronization signal S2*b*. The time point t3*c* is a falling edge (i.e., OFF point) of the pulse of the synchronization signal S2*c*.

A time interval Δt is provided between the rising edge of the pulse of the synchronization signal S2*a* and the rising edge of the pulse of the synchronization signal S2*b*. Furthermore, a time interval Δt is provided between the rising edge of the pulse of synchronization signal S2*b* and the rising edge of the pulse of synchronization signal S2*c*. The time interval Δt corresponds to the period of each drive waveform signal Pa, Pb, and Pc.

A time Δt−td between time t2*a* and time t3*a* corresponds to a period of the synchronization signal S2*a*, and is shorter than a period Δt of the drive waveform signal Pa. A time Δt−td between time t2*b* and time t3*b* corresponds to a period of the synchronization signal S2*b*, and is shorter than a period Δt of the drive waveform signal Pb. A time Δt−td between time t2*c* and time t3*c* corresponds to a period of the synchronization signal S2*c*, and is shorter than a period Δt of the drive waveform signal Pc.

As mentioned above, the data Ak, Bk and Ck constituting the time-series data are arranged in sequence with the time interval Δt. Further, after the elapse of the delay time td, the drive waveform signal Pa reaches a target value (i.e., a value corresponding to the value of the data Ak). After the elapse of delay time td, the drive waveform signal Pb reaches a target value (i.e., a value corresponding to the value of data Bk). After the elapse of delay time td, the drive waveform signal Pc reaches a target value (i.e., a value corresponding to the value of data Ck).

Therefore, when the control circuit 51 accesses the time-division multiplexed signal at t2*a*, i.e., at the rising edge of the pulse of the synchronization signal S2*a*, the control circuit 51 can obtain the drive waveform signal Pa, which corresponds to data Ak and indicates drive waveform A. When the control circuit 51 accesses the time-division multiplexed signal at t2*b*, i.e., at the rising edge of the pulse of the synchronization signal S2*b*, the control circuit 51 can obtain the drive waveform signal Pb, which corresponds to data Bk and indicates drive waveform B. When the control circuit 51 accesses the time-division multiplexed signal at t2*c*, i.e., at the rising edge of the pulse of the synchronization signal S2*c*, the control circuit 51 can obtain the drive waveform signal Pc, which corresponds to data Ck and indicates drive waveform C. In other words, one type of time-division multiplexed signal is input to one n-th switch 54(*n*), thereby one of the drive waveform signal Pa, the drive waveform signal Pb, and the drive waveform signal Pc is separated from one type of time-division multiplexed signal. The n-th switch 54(*n*) is an example of an separator according to aspects of the present disclosures.

The switch group 54 selects the n-th switch 54(*n*) indicated by the selection signal S1, and selects the synchronization signals S2*a*, S2*b* or S2*c* associated with the selection signal S1 as selected. The switch group 54 opens and closes the selected n-th switch at the opening/closing timings indicated by the selected one of the synchronization signals S2*a*-S2*c*. In other words, the switch group 54 opens/closes the n-th switch 54(*n*) in accordance with a particular sampling frequency.

Figure 7A:
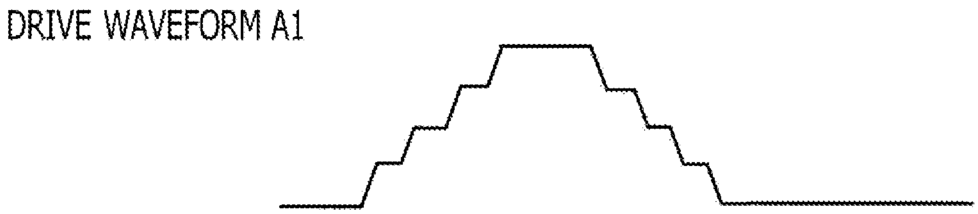
FIGS. 7A, 7B and 7C show examples of the drive waveform input to an actuator in accordance with opening/closing of an n-th switch.
Figure 7B:
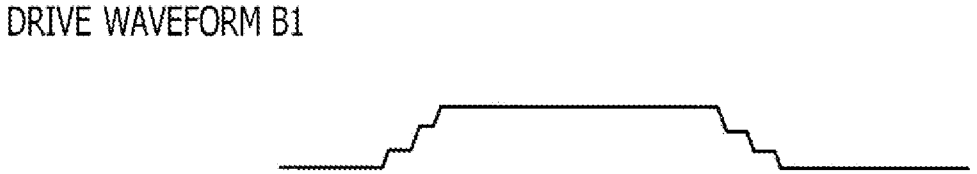
Figure 7C:
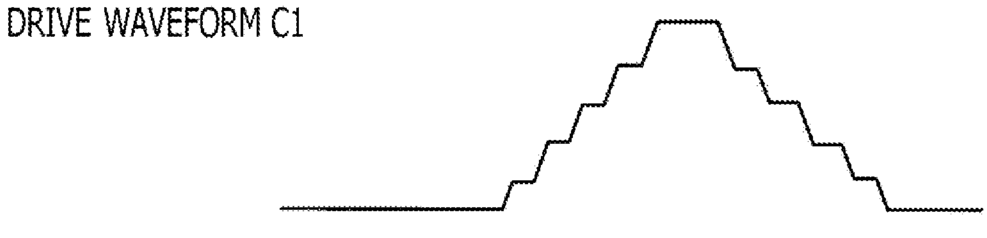

FIGS. 7A-7C show the drive waveforms input to the actuator 88 in accordance with the opening/closing of the n-th switch 54(*n*). When the synchronization signal S2*a* is selected, the switch group 54 closes the n-th switch n-th during a period where the pulse of the synchronization signal S2*a* is in the high-level state, and opens the n-th switch 54(*n*) during a period where the pulse of the synchronization signal S2*a* is in the low-level state. Electrical charge applied to the individual electrode 85 when the n-th switch 54(*n*) is closed is held by the first condenser 89*a* and the second condenser 89*b*, and the drive waveform A1 is input to the actuator 88 as shown in FIG. 7A. In other words, in accordance with the particular sampling frequency, the drive waveform signal Pa is separated from the time-division multiplexed signal, and the actuator 88 is driven by the drive waveform signal Pa. It is noted that, in order to represent a change (i.e., concavity and convexity) of the drive waveform signal Pa, three or more pieces of data Ak is required.

When the synchronization signal S2*b* is selected, the switch group 54 closes the n-th switch 54(*n*) during a period where the pulse of the synchronization signal S2*b* is in the high-level state, and opens the n-th switch 54(*n*) during a period where the pulse of the synchronization signal S2*b* is in the low-level state. Electrical charge applied to the individual electrode 85 when the n-th switch 54(*n*) is closed is held by the first condenser 89*a* and the second condenser 89*b*, and the drive waveform B1 is input to the actuator 88 as shown in FIG. 7B. In other words, in accordance with the particular sampling frequency, the drive waveform signal Pb is separated from the time-division multiplexed signal, and the actuator 88 is driven by the drive waveform signal Pb. It is noted that, in order to represent a change (i.e., concavity and convexity) of the drive waveform signal Pb, three or more pieces of data Bk is required.

When the synchronization signal S2*c* is selected, the switch group 54 closes the n-th switch 54(*n*) during a period where the pulse of the synchronization signal S2*c* is in the high-level state, and opens the n-th switch 54(*n*) during a period where the pulse of the synchronization signal S2*c* is in the low-level state. Electrical charge applied to the individual electrode 85 when the n-th switch 54(*n*) is closed is held by the first condenser 89*a* and the second condenser 89*b*, and the drive waveform C1 is input to the actuator 88 as shown in FIG. 7C. In other words, in accordance with the particular sampling frequency, the drive waveform signal Pc is separated from the time-division multiplexed signal, and the actuator 88 is driven by the drive waveform signal Pc. It is noted that, in order to represent a change (i.e., concavity and convexity) of the drive waveform signal Pc, three or more pieces of data Ck is required.

The particular sampling frequency is higher than a resonance frequency of the inkjet head 8. The resonance frequency of the inkjet head 8 is a resonance frequency when the pressure chamber 81 is not filled with liquid (ink), or a resonance frequency when the pressure chamber 81 is filled with the liquid (ink). When, for example, the resonance frequency when the pressure chamber 81 is not filled with the ink is 100 kHz, the resonance frequency when the pressure chamber 81 is filled with the ink is less than 100 kHz. Concretely, for example, the resonance frequency when the pressure chamber 81 is filled with the ink is 90 kHz. In other words, the resonance frequency of the inkjet head 8 when the pressure chamber 81 is not filled with the ink is greater than the same when the pressure chamber 81 is filled with the ink.

In the printing device 1 according to the present embodiment, the time-division multiplexed signal is generated based on the waveform data Da, Db and Dc which represent the waveforms A, B and C, respectively. From the generated time-division multiplexed signal, the drive waveform signal Pa indicating the drive waveform A, the drive waveform signal Pb indicating the drive waveform B, and the drive waveform signal Pc indicating the drive waveform C are separated. The actuator 88 is driven by the drive waveform signal Pa, Pb or Pc. That is, by selecting the drive waveform signal Pa, Pb or Pc, the amplitude of the drive waveform applied to the actuator 88 can be adjusted. Within a single period for printing one pixel, a cycle of only one of the selected drive waveforms A1, A2 and A3, while cycles of the unselected drive waveforms are not included. Therefore, a standby time of the nozzles 80 can be reduced.

There could be a case where the target values of the drive waveforms Pa, Pb and Pc are different. For example, in a case where the drive waveform signal Pb is output after the drive waveform signal Pa is output, and the target value of the drive waveform signal Pa and the target value of the drive waveform signal Pb are different, a particular time is required until the target value of the drive waveform signal Pa is changed to reach the target value of the drive waveform signal Pb. If the pulse of the synchronization signal S2*b* rises during this particular time, a value different from the target value of the drive waveform signal Pb is obtained, an ejection waveform is not formed to be the targeted waveform, thereby the ejection amount of the ink may easily be increased/decreased with respect to the target ejection amount. In the printing device 1 according to the present embodiment, the pulse of the synchronization signal S2*b* rises after elapse of the particular time (i.e., the delay time), it is ensured that the target value of the drive waveform can be obtained. That is, the ejection waveform is formed as the targeted waveform, and the ejection amount of the ink is hardly increased/decreased from the target ejection amount.

Figure 8:
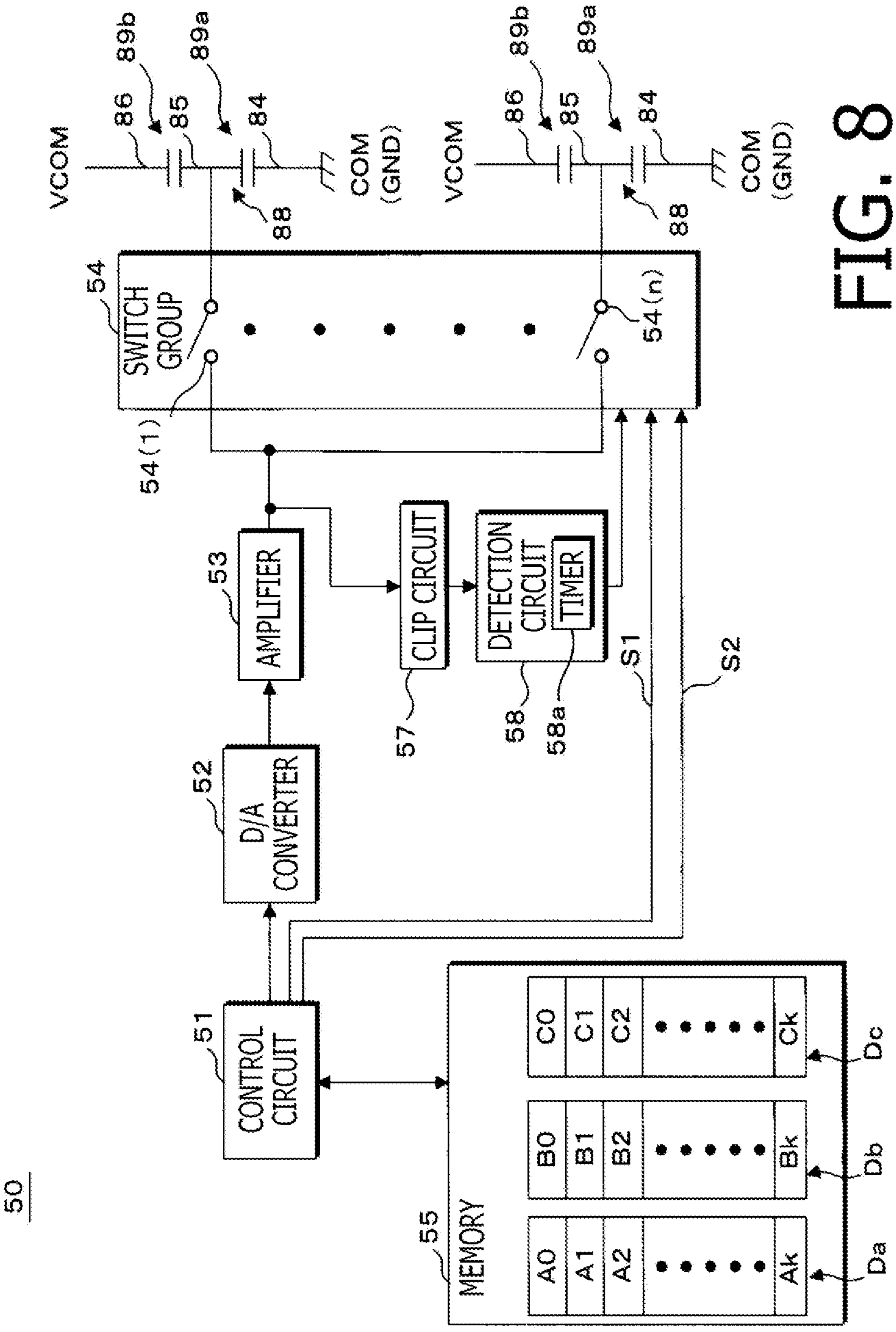
FIG. 8 is a block diagram of a controller.

Hereinafter, a printing device according to a modified embodiment will be described. In a configuration according to the modified embodiment, components same as those in the above-described embodiment are assigned with the same reference numerals, and detailed descriptions thereof will be omitted. FIG. 8 is a block diagram of the controller 50 according to the modified embodiment. The controller 50 includes a clip circuit 57 and a detection circuit 58. The detection circuit 58 includes a timer 58*a*. The delay time td is obtained with use of the clip circuit 57 and the detection circuit 58. It is noted that the obtaining of the delay time td is performed before the printing is started. It is noted the clip circuit 57 and the detection circuit 58 may be arranged on the carriage 6.

Before the printing is started, the time-division multiplexed signal is input, from the amplifier 53, to the clip circuit 57. When the amplitude of the signal (i.e., a voltage value) of the signal input to the clip circuit 57 is equal to or greater than that of a digital signal for generating the time-division multiplexed signal (hereinafter, referred to as a threshold value), the clip circuit 57 deletes a portion equal to or greater than the threshold value from the input signal, and outputs a portion less than the threshold value from the input signal to the detection circuit 58. It is noted that the threshold value has been input in advance. For example, when the drive waveform signal Pc shown in FIG. 6A is input to the clip circuit 57, the clip circuit 57 deletes a portion from time t2*c* to time t3*c*, which is the portion equal to or greater than the threshold value, and outputs the drive waveform signal Pc to the detection circuit 58. That is, the clip circuit 57 outputs a portion of the drive waveform signal Pc from time t1*c* to time t2*c* to the detection circuit 58. In other words, the analog signal is input from the D/A converter 52 to the clip circuit 57, and the clip circuit 57 outputs the analog signal within a particular voltage range to the detection circuit 58. The detection circuit 58 starts measuring time, with the timer 58*a*, from a point of time when the signal has been input. The detection circuit 58 detects the amplitude of the input signal and stops measuring time when the amplitude of the input signal has reached the threshold value. It is noted that the time measured with use of the timer 58*a* is the delay time. For example, when the drive waveform signal Pc shown in FIG. 6A is input to the detection circuit 58, time t1*c* is a measuring start time and time t2*c* is a measuring end time, and an interval between time t1*c* and time t2*c* is the delay time td.

The clip circuit 57 may be configured such that, when the amplitude (i.e., the voltage value) of the input signal is equal to or less than the threshold value, the clip circuit 57 may delete a portion of the input signal equal to or less than the threshold value and output the processed signal to the detection circuit 58. It is noted that the threshold value has been stored, in advance, in the clip circuit 57. For example, when the drive waveform signal Pa shown in FIG. 6A is input to the clip circuit 57, the clip circuit 57 deletes a portion from time t2*a* to time t3*a*, which is a portion corresponding to the threshold value, from the input signal, and outputs the thus processed drive waveform signal Pa to the detection circuit 58. That is, the clip circuit 57 outputs a portion of the drive waveform signal Pa from time t1*a* to time t2*a* to the detection circuit 58. The detection circuit 58 starts measuring time, with the timer 58*a*, from a point of time when the signal has been input. The detection circuit 58 detects the amplitude of the input signal and stops measuring time when the amplitude of the input signal has reached the threshold value. It is noted that the time measured with use of the timer 58*a* is the delay time. For example, when the drive waveform signal Pa shown in FIG. 6A is input to the detection circuit 58, time t1*a* is a measuring start time and time t2*a* is a measuring end time, and an interval between time t1*a* and time t2*a* is the delay time td. The detection circuit 58 outputs the delay time td to the switch group 54. In other words, the switch group 54 is configured to obtain the delay time td from the detection circuit 58.

When obtaining the delay time td, the switch group 54 turns on the pulse of the synchronization signals S2*a*, S2*b* or S2*c* after the elapse of the delay time td with respect to the input time t1*a*, t1*b* or t1*c* of the drive waveform signal Pa, Pb or PC. That is, the switch group 54 turns on the pulse of the synchronization signals S2*a*, S2*b* or S2*c* at time t2*a*, t2*b* or t2*c*. In response, the switch group 54 opens/closes the n-th switch 54(*n*) to separate the drive waveform signals Pa, Pb or PC from the time-division multiplexed signal. Then, the ink is ejected from the nozzle 80, and the process similar to the flushing process is performed.

The switch group 54 may be configured such that the n-th switch 54(*n*) is kept opened. By keeping the n-th switch 54(*n*) in the opened state, unnecessary ink ejection can be prevented in the obtaining process of the delay time td.

The control circuit 51 may be configured to output the digital signal of a non-ejection waveform. The digital signal of the non-ejection waveform is converted into an analog signal by the D/A converter 52, amplified by the amplifier 53 and input to the clip circuit 57. An analog signal of the non-ejection waveform is a signal having a lower voltage than the drive waveform signal not for ejecting ink from the nozzles 80. The use of the analog signal representing the non-ejection waveform, unnecessary ink ejection can be prevented. When the analog signal representing the non-ejection waveform is input to the clip circuit 57 and the detection circuit 58, the n-th switch 54(*n*) may be closed. In this case, although the ink is not ejected, by swinging a surface (i.e., meniscus) of the ink, drying of the ink at the nozzle 80 can be prevented. The clip circuit 57 and the detection circuit 58 may be included in the switch group 54.

Figure 9:
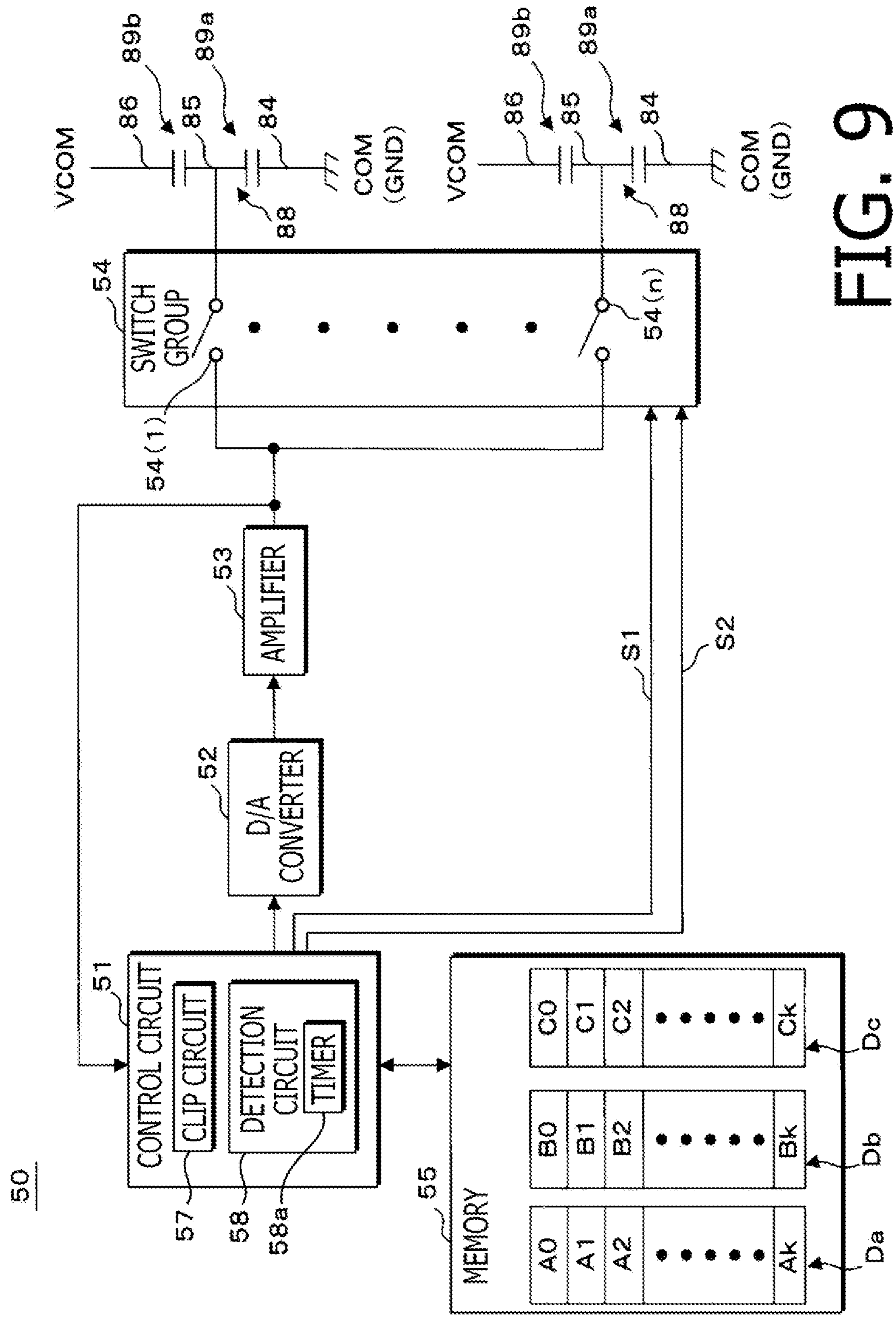
FIG. 9 is a block diagram of a controller.

FIG. 9 is a block diagram of the controller 50 according to a first modification of the modified embodiment. In this modification, the clip circuit 57 and the detection circuit 58 are included in the control circuit 51. The detection circuit 58, or the control circuit 51 outputs the delay time to the switch group 54.

Based on the delay time td, the control circuit 51 sets a point of time of a rising edge of a pulse that is a part of the synchronization signal S2*a* corresponding to one drive waveform signal Pa as time t2*a*, and sets a point of time of a rising edge of another pulse that is a part of the synchronization signal S2*a* corresponding to another drive waveform signal Pa also as time t2*a*. Then, the control circuit 51 may set a point of time of a falling edge of the pulse that is a part of the synchronization signal S2*a* corresponding to one drive waveform signal Pa as time t3*a*, and set a point of time of a falling edge of the other pulse that is a part of the synchronization signal S2*a* corresponding to the other drive waveform signal Pa also as time t3*a*, and output the synchronization signal S2*a*.

Further, based on the delay time td, the control circuit 51 sets a point of time of a rising edge of a pulse that is a part of the synchronization signal S2*b* corresponding to one drive waveform signal Pb as time t2*b*, and sets a point of time of a rising edge of another pulse that is a part of the synchronization signal S2*b* corresponding to another drive waveform signal Pb also as time t2*b*. Then, the control circuit 51 may set a point of time of a falling edge of the pulse that is a part of the synchronization signal S2*b* corresponding to one drive waveform signal Pb as time t3*b*, and set a point of time of a falling edge of the other pulse that is a part of the synchronization signal S2*b* corresponding to the other drive waveform signal Pa also as time t3*a*, and output the synchronization signal S2*b*.

Furthermore, based on the delay time td, the control circuit 51 sets a point of time of a rising edge of a pulse that is a part of the synchronization signal S2*c* corresponding to one drive waveform signal Pc as time t2*c*, and sets a point of time of a rising edge of another pulse that is a part of the synchronization signal S2*c* corresponding to another drive waveform signal Pc also as time t2*c*. Then, the control circuit 51 may set a point of time of a falling edge of the pulse that is a part of the synchronization signal S2*c* corresponding to one drive waveform signal Pc as time t3*c*, and set a point of time of a falling edge of the other pulse that is a part of the synchronization signal S2*c* corresponding to the other drive waveform signal Pa also as time t3*c*, and output the synchronization signal S2*c*.

Figure 10:
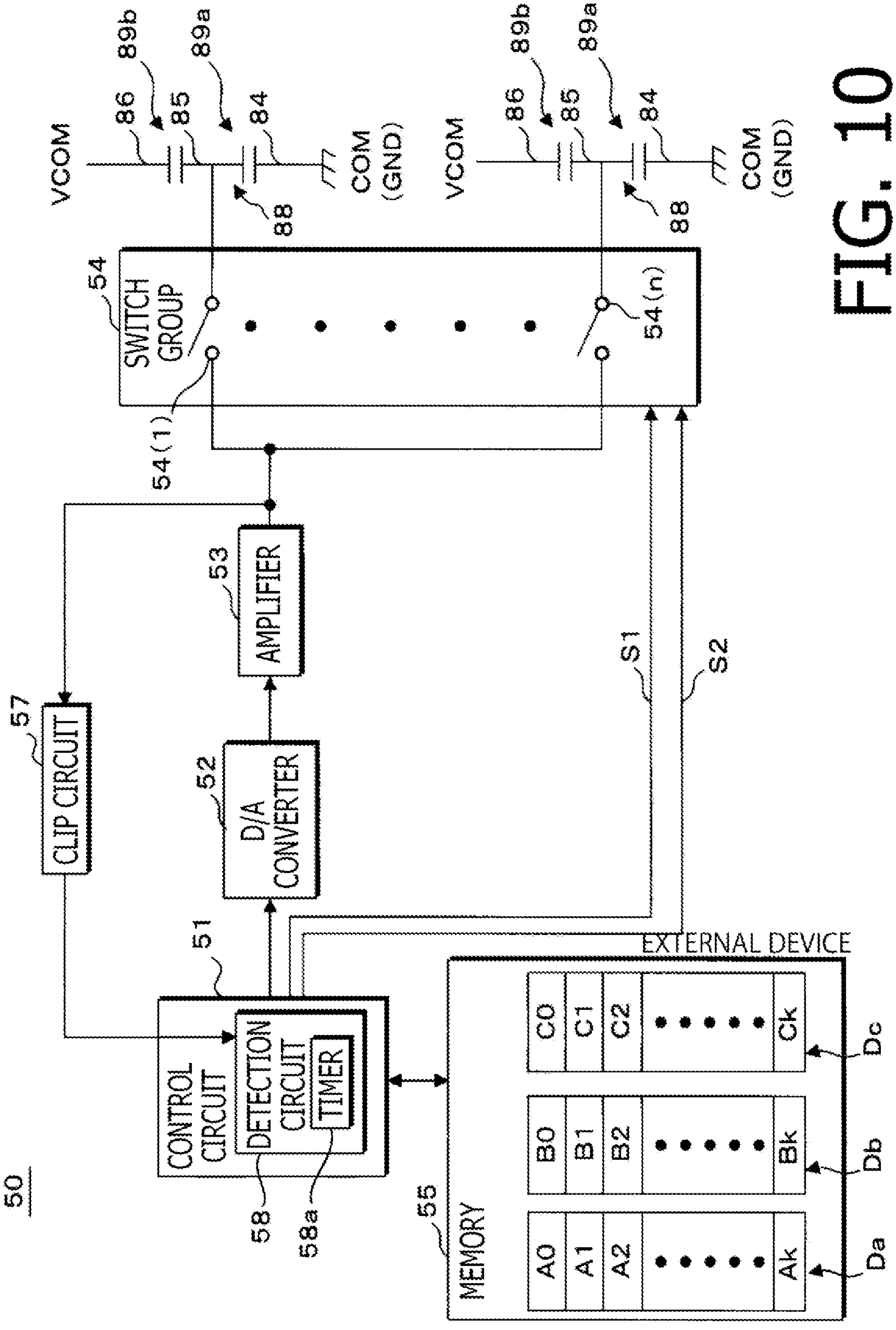
FIG. 10 is a block diagram of a controller.

FIG. 10 is a block diagram of the controller 50 according to a second modification of the modified embodiment. In this modification, the detection circuit 58 is included in the control circuit 51. The detection circuit 58, or the control circuit 51 outputs the delay time td to the switch group 54.

Based on the delay time td, the control circuit 51 sets a point of time of a rising edge of a pulse that is a part of the synchronization signal S2*a* corresponding to one drive waveform signal Pa as time t2*a*, and sets a point of time of a rising edge of another pulse that is a part of the synchronization signal S2*a* corresponding to another drive waveform signal Pa also as time t2*a*. Then, the control circuit 51 may set a point of time of a falling edge of the pulse that is a part of the synchronization signal S2*a* corresponding to one drive waveform signal Pa as time t3*a*, and set a point of time of a falling edge of the other pulse that is a part of the synchronization signal S2*a* corresponding to the other drive waveform signal Pa also as time t3*a*, and output the synchronization signal S2*a*. Further, based on the delay time td, the control circuit 51 sets a point of time of a rising edge of a pulse that is a part of the synchronization signal S2*b* corresponding to one drive waveform signal Pb as time t2*b*, and sets a point of time of a rising edge of another pulse that is a part of the synchronization signal S2*b* corresponding to another drive waveform signal Pb also as time t2*b*. Then, the control circuit 51 may set a point of time of a falling edge of the pulse that is a part of the synchronization signal S2*b* corresponding to one drive waveform signal Pb as time t3*b*, and set a point of time of a falling edge of the other pulse that is a part of the synchronization signal S2*b* corresponding to the other drive waveform signal Pa also as time t3*a*, and output the synchronization signal S2*b*. Furthermore, based on the delay time td, the control circuit 51 sets a point of time of a rising edge of a pulse that is a part of the synchronization signal S2*c* corresponding to one drive waveform signal Pc as time t2*c*, and sets a point of time of a rising edge of another pulse that is a part of the synchronization signal S2*c* corresponding to another drive waveform signal Pc also as time t2*c*. Then, the control circuit 51 may set a point of time of a falling edge of the pulse that is a part of the synchronization signal S2*c* corresponding to one drive waveform signal Pc as time t3*c*, and set a point of time of a falling edge of the other pulse that is a part of the synchronization signal S2*c* corresponding to the other drive waveform signal Pa also as time t3*c*, and output the synchronization signal S2*c*.

Figure 11:
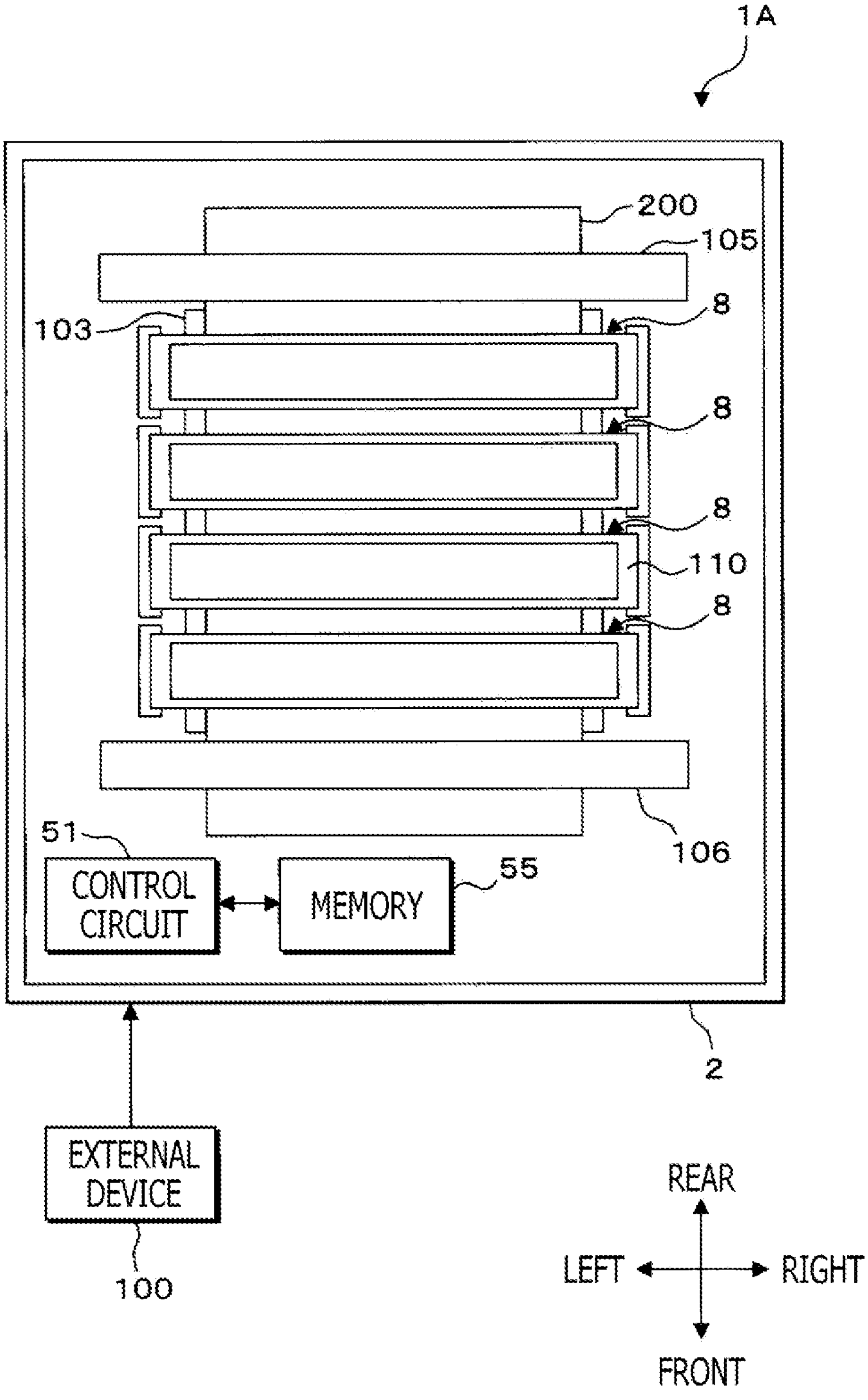
FIG. 11 is a schematic plan view of a printing device.

FIG. 11 is a schematic plan view of a printing device 1A according to a third modification of the modified embodiment. The printing device 1A has a platen 103 accommodated in a case 102, four inkjet heads 8, two conveying rollers 105 and 106, and the controller 50. The printing sheet 200 passes over the upper surface of the platen 103. The four inkjet heads 8 are arranged, above the platen 103, in the sheet conveying direction. Each inkjet head 8 is a so-called line type head. To each inkjet head 8, ink is supplied from an ink tank. Since such a configuration is well known, the ink tanks and an ink supplying mechanism are not shown in the drawings. To the four inkjet heads 8, different colors of ink are supplied, respectively.

As shown in FIG. 1, two conveying rollers 105 and 106 are arranged on a rear side and a front side with respect to the platen 103. The tow conveying rollers 105 and 106 are driven by a not-shown motor, and convey the printing sheet 200 on the platen 103 frontward.

Figure 12:
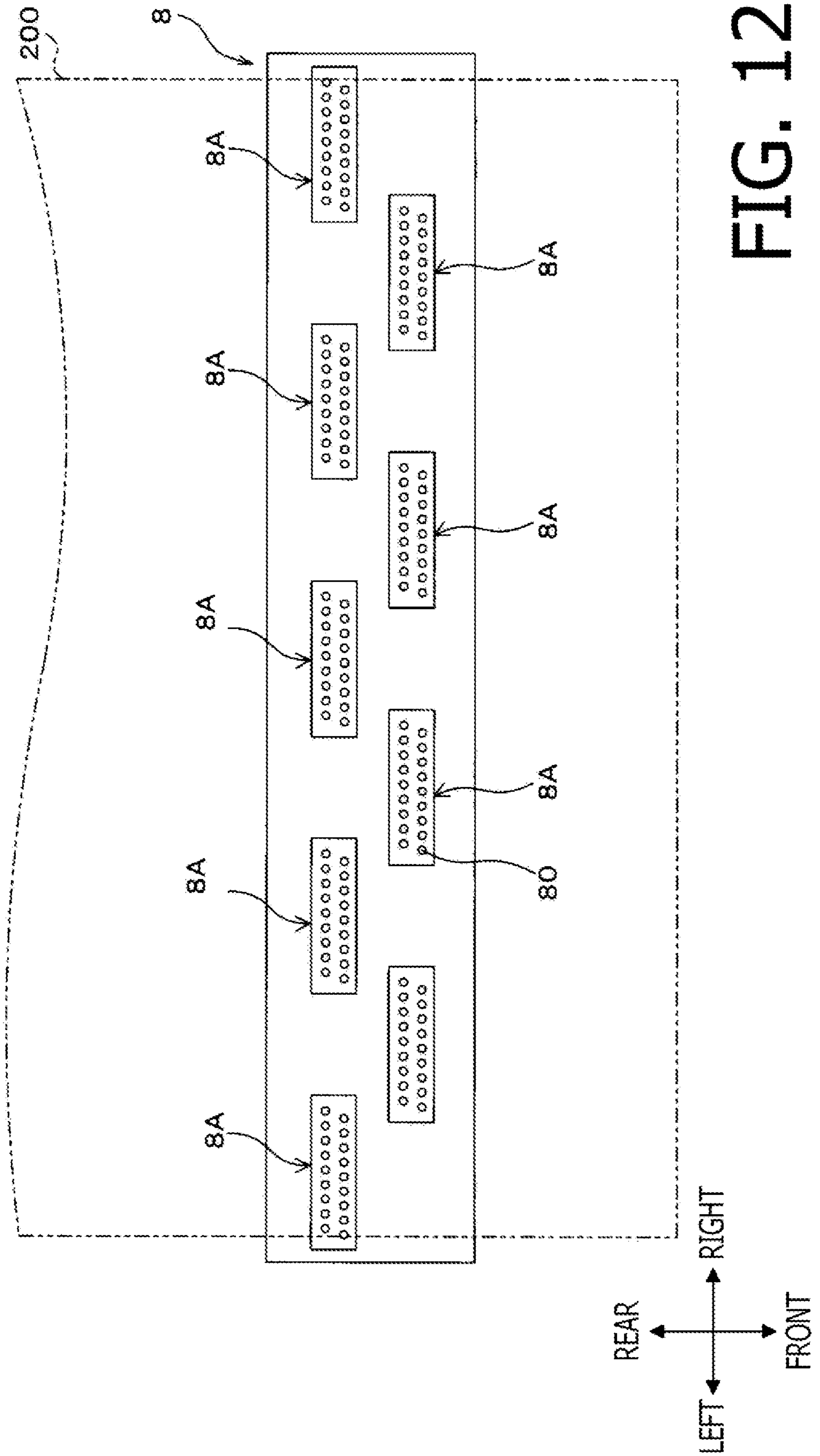
FIG. 12 is a transparent plan view of an inkjet head.

FIG. 12 is a plan cross-sectional view of the inkjet head 8. The inkjet head 8 includes multiple head units 8A each serving as a liquid ejecting device. Further, the head unit 8A is provided with a control substrate 59 described later. That is, one control substrate 59 is provided to each head unit 8A. For example, the printing device 1A has four inkjet heads 8, and each inkjet head 8 has nine head units 8A, the number of head units 8A provided to the printing device 1A is 36, and therefore, 36 control substrate is arranged at the printing device 1A.

Figure 13:
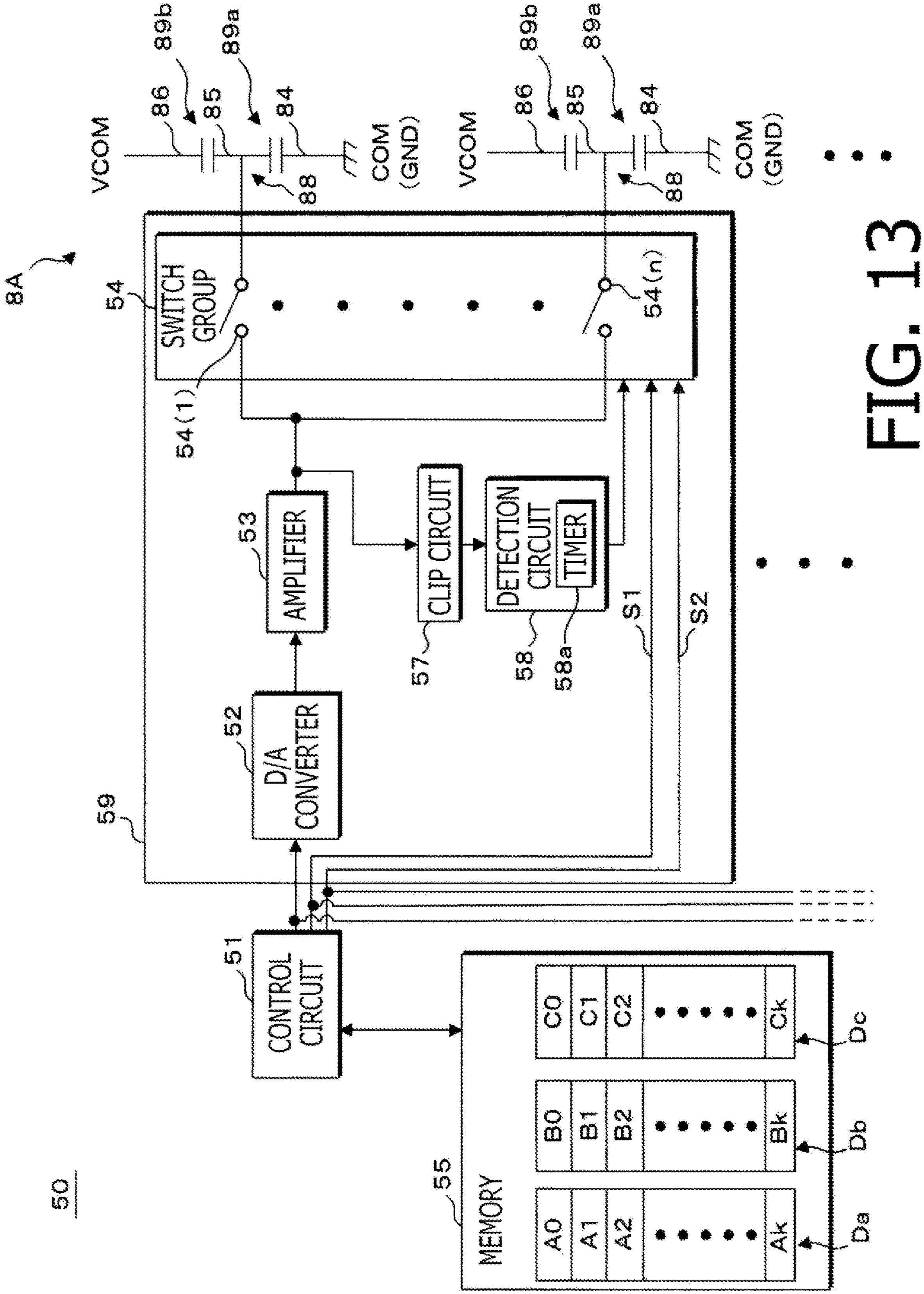
FIG. 13 is a block diagram of a controller.

FIG. 13 is a block diagram of the controller 50. The controller 50 includes the control circuit 51, the memory 55 and the control substrate 59. The control substrate 59 is provided with the D/A converter 52, the amplifier 53, the switch group 54, the clip circuit 57, and the detection circuit 58.

Figure 14:
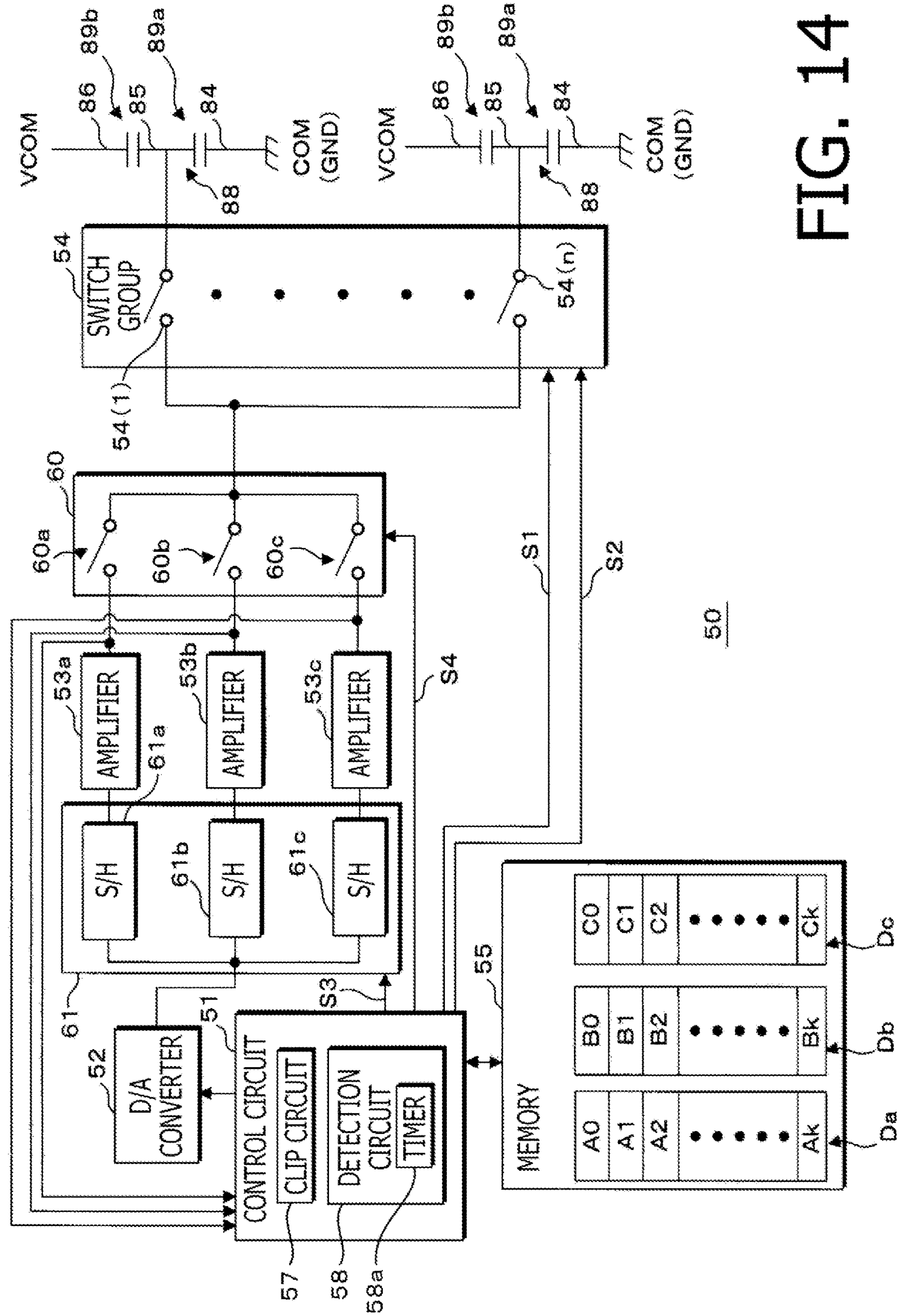
FIG. 14 is a block diagram of a controller.

FIG. 14 is a block diagram of the controller 50 according to a fourth modification of the modified embodiment. The controller 50 includes the control circuit 51, the D/A converter 52, three amplifiers 53*a*-53*c*, the switch group 54, the memory 55, a switch controller 60, and a sample and hold unit 61. The control circuit 51 includes the clip circuit 57 and the detection circuit 58. The switch controller 60 is provided with a first switch 60*a*, a second switch 60*b* and a third switch 60*c*. The sample and hold unit 61 is provide with a first sample and hold circuit 61*a*, a second sample and hold circuit 61*b*, and a third sample and hold circuit 61*c*.

The control circuit 51 outputs time-series data to the D/A converter 52. The D/A converter 52 converts the time-series data to analog signal and outputs the converted signal to the sample and hold unit 61. The control circuit 51 also outputs sampling signals S3*a*-S3*c* representing sampling frequencies to the sample and hold unit 61. The sampling signal S3*a* is input to the first sample and hold unit 61, the sampling signal S3*b* is input to the second sample and hold circuit 61*b*, and the sampling signal S3*c* is input to the third sample and hold circuit 61*c*. It is noted that the sampling periods of respective sampling signals S3*a*-S3*c* are different from each other, and shifted by a time interval Δt. In the following description, the three sampling signals S3*a*, S3*b* and S3*c* will occasionally be referred simply as "sampling signals S3" (see FIG. 14).

The first sample and hold circuit 61*a* samples and holds an analog signal with the sampling period of the sampling signal S3*a* and outputs the signal to the amplifier 53*a*. The second sample and hold circuit 61*b* samples and holds an analog signal with the sampling period of the sampling signal S3*b* and outputs the signal to the amplifier 53*b*. The third sample and hold circuit 61*c* samples and holds the analog signal with the sampling period of the sampling signal S3*c* and outputs the signal to the amplifier 53*c*.

The control circuit 51 outputs a time-division signal S4*a* corresponding to the analog signal output by the amplifier 53*a*, a time-division signal S4*b* corresponding to the analog signal output by the amplifier 53*b*, and a time-division signal S4*c* corresponding to the analog signal output by the amplifier 53*c* to the switch controller 60. In the following description, the three time-division signals S4*a*, S4*b*, and S4*c* may also simply be referred to as time-division signals S4 (see FIG. 14).

FIGS. 15A-15F illustrate relationship between the analog signals 61A-61C and the time-division signals S4*a*-S4*c*. Analog signals 61A, 61B and 61C shown in FIGS. 15A-15C are analog signals output by the first sample and hold circuit 61*a*, the second sample and hold circuit 61*b*, and the third sample and hold circuit 61*c*, respectively. As shown in FIGS. 15D-15F, the control circuit 51 outputs the time-division signal S4*a* corresponding to analog signal 61A, the time-division signal S4*b* corresponding to analog signal 61B, and the time-division signal S4*c* corresponding to analog signal 61C to the switch controller 60.

The time-division signals S4*a*, S4*b* and S4*c* are pulse waves. Between the rise point of the pulse of the time-division signal S4*a* and the rise point of the pulse of the time-division signal S4*b*, a time interval Δt is provided. Furthermore, between the rise point of the pulse of the time-division signal S4*b* and the rise point of the pulse of the time-division signal S4*c*, a time interval Δt is provided, and between the rise point of the pulse of the time-division signal S4*c* and the rise point of the pulse of the time-division signal S4*a*, a time interval Δt is provided. The time-division signals S4*a*, S4*b*, and S4*c* correspond to the above-mentioned s S2*a*, S2*b*, and S2*c*, respectively.

The first switch 60*a* closes when the pulse of the time-division signal S4*a* is in the high-level range and opens when the pulse of the time-division signal S4*b* is in the low-level range. The second switch 60*b* closes when the pulse of the time division signal S4*b* is in the high-level range and opens when the pulse is in the low-level range. The third switch 60*c* closes when the pulse of the time-division signal S3*c* is in the high-level range and opens when the pulse of the time-division signal S3*c* is in the low-level range. The first, second, and third switches 60A, 60B, and 60C may be open at the same time, but not closed at the same time. This is because if the first, second and third switches 60*a*, 60*b* and 60*c* are closed at the same time, the analog signals 61A, 61B and 61C will be mixed together.

The switch controller 60 outputs a time-division multiplexed signal that is a composite of the analog signals 61A-61C. The time-division multiplexed signal is similar to the analog signal shown in FIGS. 5A-5C. Since the analog signals 61A, 61B, and 61C are not mixed, in the time-division multiplexed signal, part of the analog signal 61A is continuous with part of the analog signal 61B, part of the analog signal 61B is continuous with part of the analog signal 61C, and part of the analog signal 61C is continuous with part of the analog signal 61A. In other words, in the time-division multiplexed signal, there is no analog signal 61C or any other waveform analog signal between the part of the analog signal 61A and the part of the analog signal 61B. Furthermore, in the time-division multiplexed signal, there is no analog signal 61A or any other waveform analog signal between the part of the analog signal 61B and the part of the analog signal 61C. Furthermore, in the time-division multiplexed signal, there is no analog signal 61B or any other waveform analog signal between the part of the analog signal 61C and the part of the analog signal 61A. The time-division multiplexed signal is input to the switch group 54. The switching control of the switch group 54 and the driving of the actuator 88 are the same as in the above-described embodiment.

As shown in FIG. 14, the analog signals 61A-61C respectively output by the amplifiers 53A, 53B, and 53C are input to the clip circuit 57. A delay time is obtained for each of the analog signals 61A-61C by means of the clip circuit 57 and the detection circuit 58. That is, the analog signal 61A is used to obtain a first delay time, the analog signal 61B is used to obtain a second delay time, and the analog signal 61C is used to obtain a third delay time.

Figure 16:
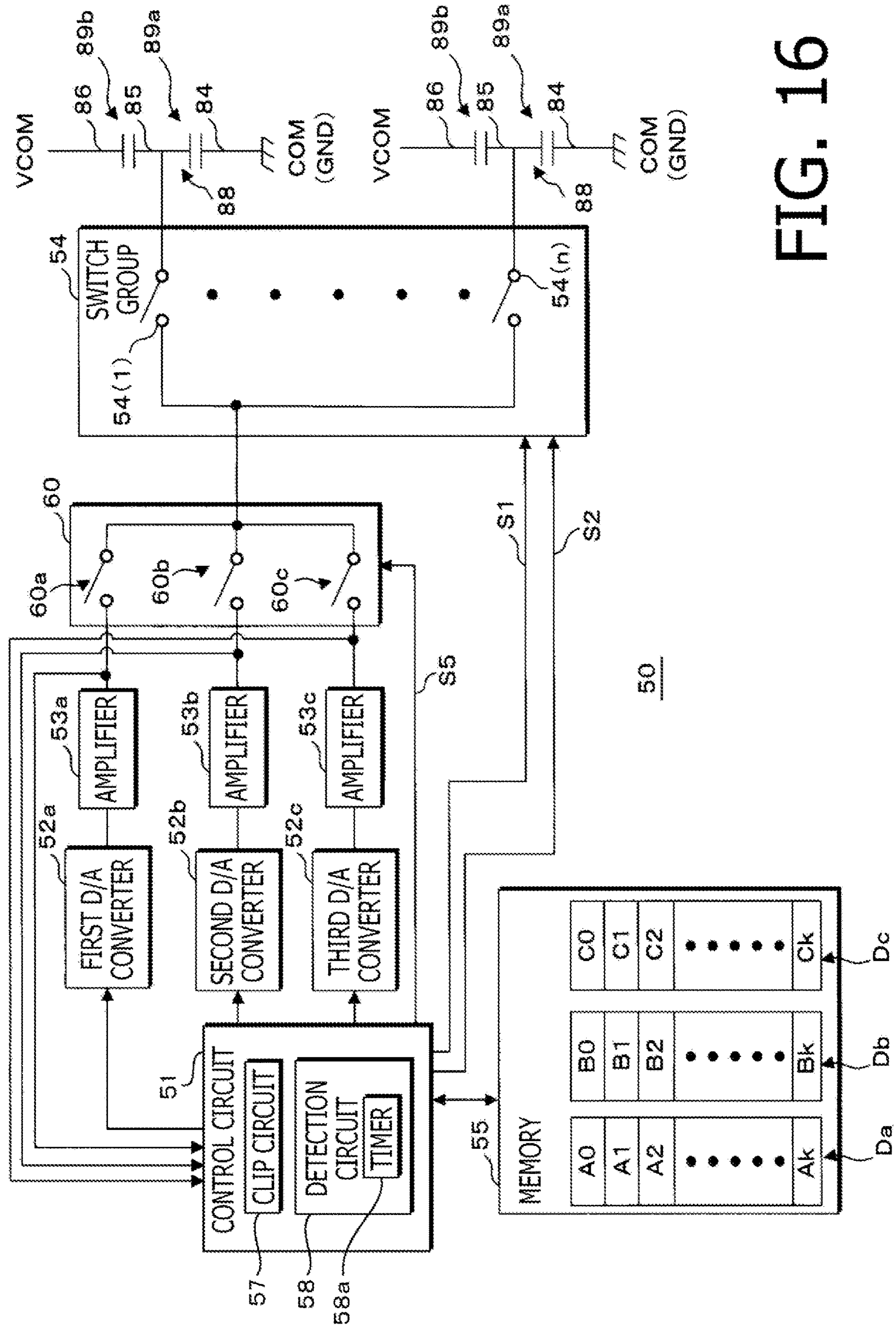
FIG. 16 is a block diagram of a controller.

FIG. 16 is a block diagram of the controller 50 according to a fifth modification of the modified embodiment. The controller 50 has a configuration similar to that of the fourth modification (see FIGS. 15A-15F) except that the controller 50 according to the fifth modification is provided with a first D/A converter 52*a*, a second D/A converter 52*b*, a third D/A converter 52*c*, while does not have the sample and hold unit 61.

To drive the actuator 88, the control circuit 51 accesses the memory 55 to obtain the drive waveform data Da, and outputs the obtained drive waveform data Da to the first D/A converter 52*a*. Further, the control circuit 51 accesses the memory 55 to obtain the drive waveform data Db, and outputs the obtained drive waveform data Db to the second D/A converter 52*b*. Furthermore, the control circuit 51 accesses the memory 55 to obtain drive waveform data Dc and output the obtained drive waveform data Dc to the third D/A converter 52*c*.

The first D/A converter 52*a*, second D/A converter 52*b*, and third D/A converter 52*c* output analog signals 61A, 61B, and 61C to three amplifiers 53*a*, 53*b*, and 53*c*, respectively. The amplifiers 53A, 53B, and 53C amplify the analog signals 61A, 61B, and 61C and output the analog signals 61A, 61B, and 61C amplified by the three amplifiers 53*a*, 53*b*, and 53*c*, respectively to the switch controller 60, respectively. The analog signals 61A, 61B, and 61C are the same as those shown in FIG. 14. The control circuit 51 outputs the time-division signal S4*a* corresponding to the analog signal 61A, the time-division signal S4*b* corresponding to the analog signal 61B, and the time-division signal S4*c* corresponding to the analog signal 61C to the switch controller 60. As in the fourth modification, the switch controller 60 outputs a time-division multiplexed signal that is a composite of the analog signals 61A-61C.

As shown in FIG. 16, the analog signals 61A-61C output by the amplifiers 53*a*, 53*b* and 53*c* are input to the clip circuit 57 before being input to the n-th switch 54(*n*). The delay time is obtained for each of the analog signals 61A-61C by means of the clip circuit 57 and the detection circuit 58. That is, the first delay time is obtained using the analog signal 61A, the second delay time is obtained using the analog signal 61B, and the third delay time is obtained using the analog signal 61C.

Figure 17:
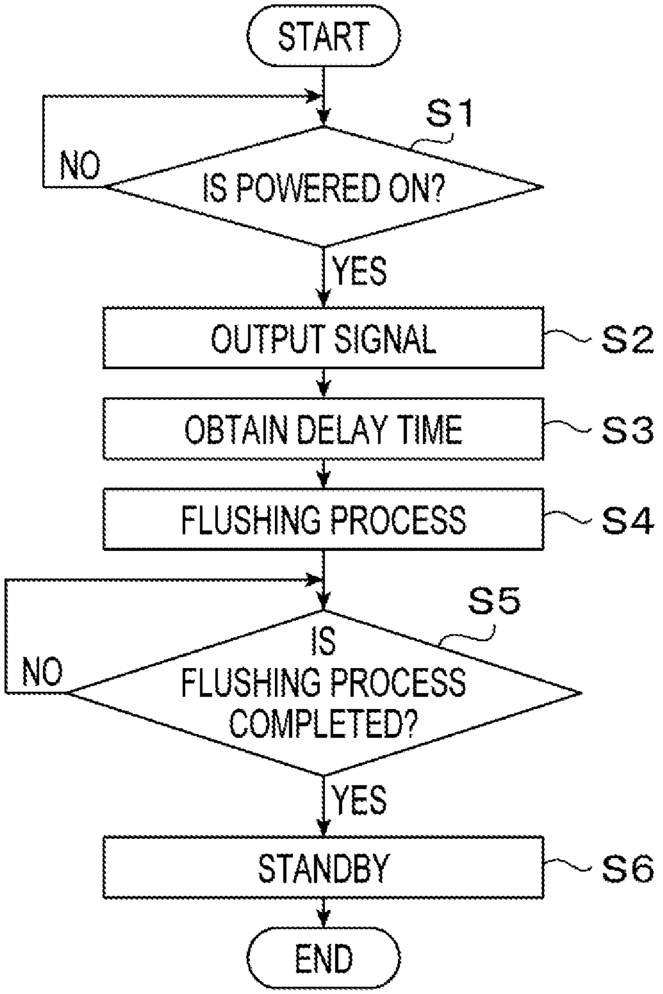
FIG. 17 is a flowchart illustrating a delay time obtaining process.

FIG. 17 is a flowchart illustrating the delay time obtaining process according to the modified embodiment. The control circuit 51 determines whether the printing device 1 is powered on (S1). When the printing device 1 is not powered on (S1: NO), the control circuit 51 returns to S1. When the printing device 1 powered on (S1: YES), the control circuit 51 outputs a signal to obtain the delay time td (S2). The control circuit 51 obtains the delay time td using the clip circuit 57 and the detection circuit 58 (S3).

The control circuit 51 performs the flushing process (S4). The flushing process is a process of causing the nozzles 80 to eject the ink for the purpose other than the printing, and is performed by a flushing receiver 21. The control circuit 51 determines whether the flushing process is completed (S5). Until the flushing process is completed (S5: NO), determination in S5 is repeated.

When the flushing process has been completed (S5: YES), the control circuit 51 becomes in a standby state (S6).

The control circuit 51 may execute the delay time obtaining process during the execution of the printing process. For example, the delay time obtaining process may be performed after receiving a print job and before executing one print task. A print task is a unit that constitutes a print job. For example, one printing task is a liquid ejection process that is performed while the inkjet head 8 moves to the right or left by an amount of a width of the printing sheet 200. Further, the delay time obtaining process may be executed after the print job has been completed and before the flushing process is performed. Furthermore, when a non-ejection flushing process is to be executed, the delay time obtaining process may be executed prior to the execution of the non-ejection flushing process. The delay time obtaining process may be executed after the completion of the execution of one printing task and before the execution of the flushing process. The control circuit 51 is an example of an obtaining circuit according to aspects of the present disclosures.

Hereinafter, the printing device 1 according to another modification of the embodiment will be described. The same reference numerals are used for the same components as in the above-described embodiment and modified embodiment, and the detailed description thereof is omitted.

FIGS. 18A-18D show an ideal time-division multiplexed signal and ideal synchronization signals. The ideal time-division multiplexed signal is the signal calculated based on the drive waveform data stored in the memory 55. The ideal time-division multiplexed signal includes a drive waveform signal Pa', indicating the drive waveform A, a drive waveform signal Pb', indicating the drive waveform B, and a drive waveform signal PC', indicating the drive waveform C. The synchronization signal S2*a*' is a pulse signal for separating the drive waveform signal Pa' from the ideal time-division multiplexed signal. The synchronization signal S2*b*' is a pulse signal for separating the drive waveform signal Pb' from the ideal time-division multiplexed signal. The synchronization signal S2*c*' is a pulse signal for separating the drive waveform signal PC' from the ideal time-division multiplexed signal.

Figures 18A, 18B, 18C, 18D:
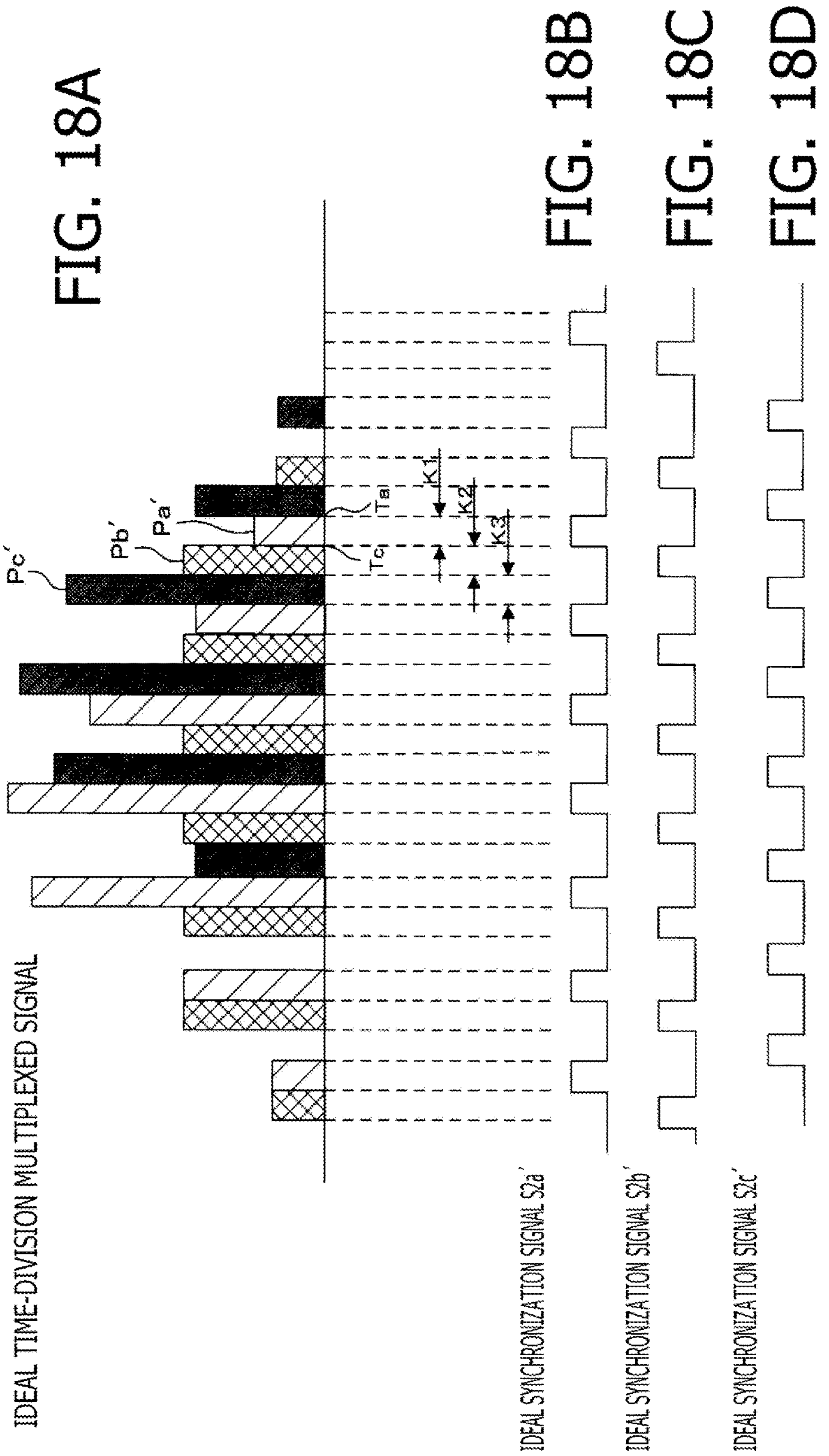
FIGS. 18A-18D show an ideal time-division multiplexed signal and ideal synchronization signals.

In FIG. 18A, Ta indicates a start point of an ON state of the drive waveform signal Pa', and Tc indicates an end point of an ON state of the drive waveform signal Pa'. Each pulse of the synchronization signal S2*a*' turns on for the time between times Ta and Tc. The timing at which each pulse of the synchronization signal S2*a*' turns on is the same as the timing at which the drive waveform signal Pa' turns on. That is, the synchronization signal S2*a*' separates the drive waveform signal Pa' from the ideal time-division multiplexed signal.

A time period K1 indicates the time that the drive waveform signal Pa' remains in an ON state, that is, the time that the pulse of the synchronization signal S2*a*' remains in an ON state. A time period K2 indicates the time that the drive waveform signal Pb' remains in an ON state, that is, the time that the pulse of the synchronization signal S2*b*' remains in an ON state. A time period K3 indicates the time that the drive waveform signal PC' remains in an ON state, that is, the time that the pulse of the synchronization signal S2*c*' remains in an ON state. The time periods K1, K2 and K3 are arranged in sequence without gaps.

During the time period K2, the drive waveform signal Pb' is separated from the ideal time-division multiplexed signal by the synchronization signal S2*b*'. During the time period K3, the drive waveform signal Pc' is separated from the ideal time-division multiplexed signal by the synchronization signal S2*c*'.

FIGS. 19A-19D illustrate a delay-included time-divisional time-division multiplexed signal and delay-included synchronization signals. The delay-included time-divisional time-division multiplexed signal and the delay-included synchronization signals have delays with respect to the ideal time-division multiplexed signal and the ideal synchronization signals, respectively. Hereafter, the delay-included time-division multiplexed signal is also referred to simply as time-division multiplexed signal, and the delay-included synchronization signals are also referred to simply as synchronization signals. The time-division multiplexed signal includes the drive waveform signal Pa, which indicates the drive waveform A, the drive waveform signal Pb, which indicates the drive waveform B, and the drive waveform signal Pc, which indicates the drive waveform C. The delay-included synchronization signal S2*a* is a pulse signal for separating the drive waveform signal Pa from the delay-included time-division multiplexed signal. The delay-included synchronization signal S2*b* is a pulse signal for separating the drive waveform signal Pb from the delay-included time-division multiplexed signal. The delay-included synchronization signal S2*c* is a pulse signal for separating the drive waveform signal Pc from the delay-included time-division multiplexed signal.

Figures 19A, 19B, 19C, 19D:
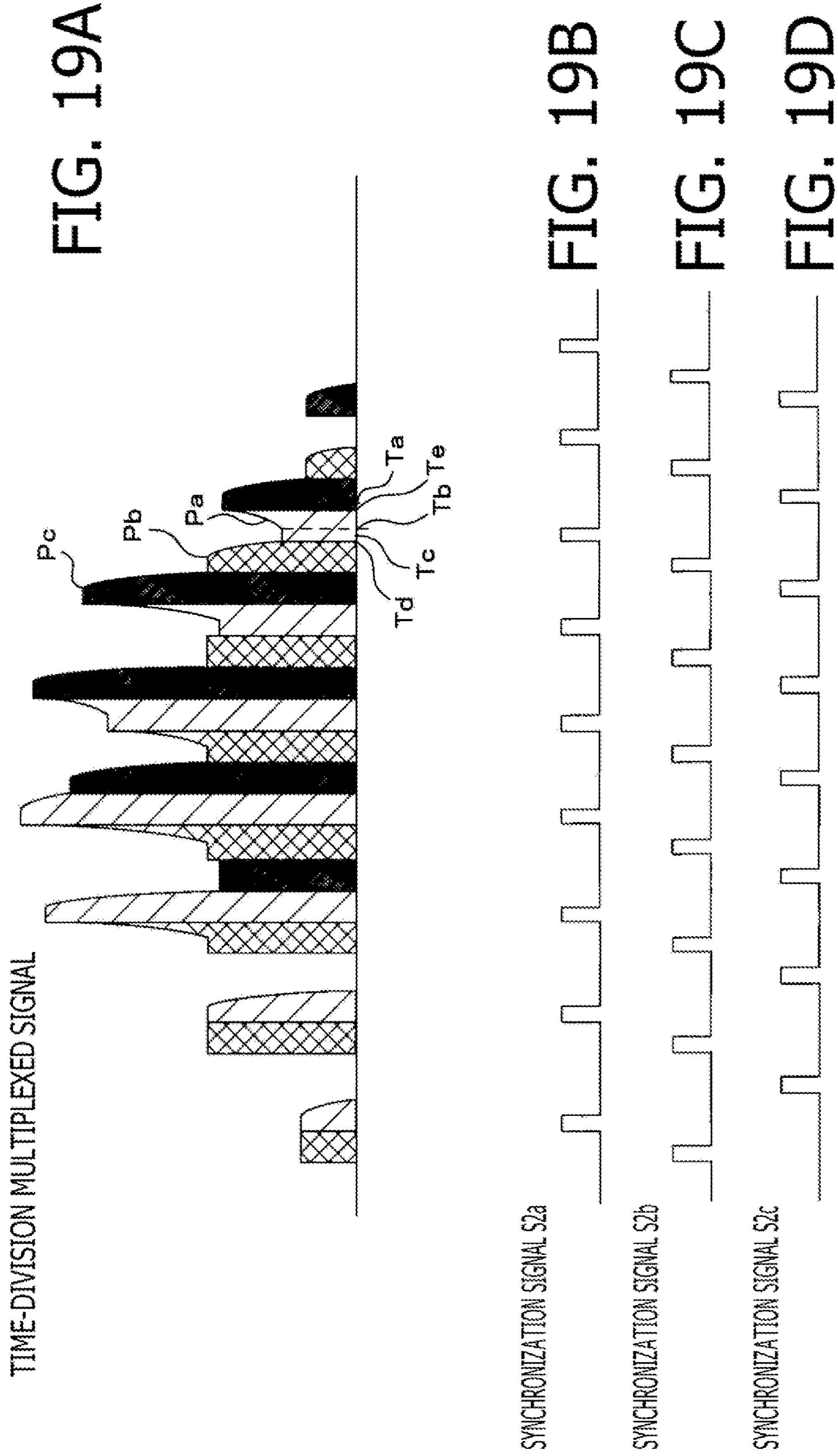
FIGS. 19A-19D show a delay-included time-division multiplexed signal and delay-included synchronization signals.

Te indicates a start of an ON state of the drive waveform signal Pa, and Td indicates an end of an ON state of the drive waveform signal Pa. Te is the time point later than Ta, and Td is the time point later than Tc. As shown in FIG. 19A, Tb indicates that the drive waveform Pa reaches a target value. Tb is a point of time after Te and before Tc.

As described above, time Td is later than time Tc. That is, the point of time when the pulse signal of the synchronization signal S2*a* ends the ON state is later than the start point of time period K2. Similarly, the point of time when the pulse signal of the synchronization signal S2*b* ends the ON state is later than the start of time period K3, and the point of time when the pulse signal of the synchronization signal S2*c* ends the ON state is later than the start of time period K1.

A point of time Te at which the drive waveform signal Pa is turned on is delayed with respect to the start time Ta at which the ideal drive waveform signal Pa' is turned on, by the delay time (Te−Ta). Furthermore, the point of time Tb at which the drive waveform signal Pa reaches the target value is delayed with respect to the point of time Te by a delay time (Te−Tb). The sum of the delay time (Te−Tb) and the delay time (Te−Ta) includes the delay time due to transient response occurring in the amplifier 53, the delay time occurring in the D/A converter, and the delay time occurring in the transmission path between the amplifier 53 and the switch group 54.

That is, the time during which the drive waveform signal Pa reaches the target value is the time between time Tb and time Td. Each pulse of the synchronization signal S2*a* is turned on for the time between time tb and time td. The timing at which each pulse of the synchronization signal S2*a* turns on is the same as the timing at which the drive waveform signal Pa turns on. In other words, the drive waveform signal Pa is separated from the time-division multiplexed signal by the synchronization signal S2*a*. Similarly, the timing at which each pulse of the synchronization signal S2*b* turns on is the same as the timing at which the drive waveform signal Pb turns on, and the timing at which each pulse of the synchronization signal S2*c* turns on is the same as the timing at which the drive waveform signal Pc turns on. The drive waveform signal Pc is separated from the time-division multiplexed signal by the synchronization signal S2*c*.

As described above, the start of the ON state of the pulse of the synchronization signal S2*a* is not the start time Ta of the ON state of the ideal drive waveform signal Pa', but time Te which is later than time Ta. Further, the end time of the ON state of the pulse of the synchronization signal S2*a* is not the end time Ec of the ideal drive waveform signal Pa', but time Td which is later than time Tc. If the start of the ON state of the pulse of the synchronization signal S2*a* is time Ta and the end of the ON state of the pulse of the synchronization signal S2*a* is time Tc, a part of the drive waveform signal PC or a transient response part of the drive waveform signal Pa (i.e., a portion not reaching the target value of the drive waveform signal Pa) is extracted. That is, a value different from the target value of the drive waveform signal Pa is obtained, the ejection waveform does not form the target waveform, and the ink ejection amount tends to increase or decrease from the target ejection amount. In the printing device according to embodiment 3, the pulse of the synchronization signal S2*a* rises after the delay time has elapsed, so the target value of the drive waveform signal Pa can be obtained. That is, the ejection waveform forms the target waveform and the ink ejection amount is less likely to increase or decrease from the target ejection amount.

FIGS. 20C-20F show the ideal drive waveform signal Pa', the delay-included aware drive waveform signal Pa and the synchronization signal S2*a* to illustrate the other modification of the embodiment. As mentioned above, the right-hand side portion indicates more past state than the left-hand side portion. FIG. 20A shows the case where the number of nozzles 80 driven is constant and the amplitudes of the drive waveform signals Pa' and Pa vary over time. The amplitudes of the drive waveform signals Pa' and Pa vary over time. As the amplitudes of the drive waveform signals Pa' and Pa increase, the transient response time Tr at the rising edge of the drive waveform signal Pa and the transient response time Tf at the falling edge of the drive waveform signal Pa increase. Therefore, the controller 50 sets a longer delay time for the start of the ON state of the synchronization signal S2*a* as the amplitude of the drive waveform signal Pa increases. Therefore, as the amplitude of the drive waveform signal Pa increases, the time that the drive waveform signal Pa maintains the target value becomes shorter, and the time that the synchronization signal S2*a* remains in ON state becomes shorter.

Furthermore, as the amplitudes of the drive waveform signals Pa' and Pa increase, the difference between the rising time of the drive waveform signal Pa' and the rising time of the drive waveform signal Pa increases. Therefore, as the amplitudes of the drive waveform signals Pa' and Pa increase, the time at which the drive waveform signal Pa reaches the target value becomes slower, and the time at which the synchronization signal S2*a* begins to be turned on also becomes slower as the amplitudes of the drive waveform signals Pa' and Pa increase. The same applies to the drive waveform signals Pb and Pc and the s S2*b* and S2*c*.

FIGS. 20C and 20D show the case where the number of nozzles 80 driven is changed over time and the amplitudes of the drive waveform signals Pa' and Pa are constant. The number of nozzles 80 driven increases over time. As the number of nozzles 80 driven increases, the transient response time Tr at the rising edge of the drive waveform signal Pa and the transient response time Tf at the falling edge of the drive waveform signal Pa increase. Therefore, as the number of nozzles 80 driven by the controller 50 increases, the time for the drive waveform signal Pa to maintain the target value becomes shorter, the delay time to the start of the ON state of the synchronization signal S2*a* becomes longer, and the ON duration also becomes shorter. The same applies to the drive waveform signals Pb and Pc and the synchronization signals S2*b* and S2*c*.

FIGS. 20E-20F show the case where the number of nozzles 80 driven is changed over time and the amplitudes of the drive waveform signals Pa' and Pa are constant. The number of nozzles 80 driven increases over time. As the number of nozzles 80 driven increases, the difference between the rise time of the drive waveform signal Pa' and the rise time of the drive waveform signal Pa increases. Therefore, as the number of nozzles 80 driven increases, the point at which the drive waveform signal Pa reaches the target value becomes later, and the point at which the synchronization signal S2*a* is in the ON state also becomes later as the number of nozzles 80 driven increases. Furthermore, as the number of nozzles 80 driven increases, the point at which the drive waveform signal Pa reaches zero from the target value also becomes later, and the point at which the synchronization signal S2*a* is turned on also becomes later as the number of nozzles 80 driven increases. In other words, the synchronization signal S2*a* remains in ON state at the falling edge of the drive waveform signal Pa'. In other words, the synchronization signal S2*a* extends across the drive waveform signals Pa' and Pb' and overlaps the time when the drive waveform signal Pb' is sent out. The same applies to drive waveform signals Pb and Pc and s S2*b* and S2*c*. The synchronization signal S2*b* remains in ON state at the falling edge of drive waveform signal Pb', and the synchronization signal S2*c* remains in ON state at the falling edge of drive waveform signal PC'. In other words, the synchronization signal S2*b* extends across the drive waveform signals Pb' and PC' and overlaps the time when the drive waveform signal PC' is sent out. Furthermore, the synchronization signal S2*c* extends across the drive waveform signal PC' and the drive waveform signal Pa' and overlaps the time at which the drive waveform signal Pa' is sent out.

In the above description, the case where the drive waveform signals Pa' and Pa are convex is described, but the same applies to the case where the drive waveform signals Pa' and Pa are concave. In other words, the synchronization signal S2*a* remains in ON state at the rising edge of the drive waveform signal Pa', the synchronization signal S2*b* remains in ON state at the rising edge of the drive waveform signal Pb', and the synchronization signal S2*c* remains in ON state at the rising edge of the drive waveform signal PC'. In other words, the synchronization signal S2*a* extends across the drive waveform signals Pa' and Pb' and overlaps the time when the drive waveform signal Pb' is sent out. Furthermore, the synchronization signal S2*b* extends across the drive waveform signal Pb' and the drive waveform signal PC', and overlaps the time when the drive waveform signal PC' is sent out. Furthermore, the synchronization signal S2*c* extends across the drive waveform signal PC' and the drive waveform signal Pa', and overlaps the time when the drive waveform signal Pa' is sent out.

FIGS. 20C, 20D, 20E and 20F all show the case where the number of nozzles 80 driven changes over time and the amplitudes of the drive waveform signals Pa' and Pa are constant. Therefore, the delay times shown in FIGS. 20C, 20D, 20E and 20F occur simultaneously.

The embodiment, modified embodiments and modifications thereof disclosed herein should be considered in all respects illustrative and not restrictive. The technical features described above can be combined with each other where appropriate, and aspects of the present disclosures are intended to include all changes within the scope of the claims and their equivalents.

What is claimed is:

1. A printing device, comprising:

a nozzle configured to eject liquid by an energy generating element;

a signal generator configured to generate a time-division multiplexed signal where first data indicating a first drive waveform and second data indicating a second drive waveform are multiplexed, the first data and the second data being transmittable by the time-division multiplexed signal through a single signal line, the time-division multiplexed signal being generated based on at least the first data and the second data, the time-division multiplexed signal including a first part of the first drive waveform, a second part of the first drive waveform, a third part of the second drive waveform and a fourth part of the second drive waveform, the third part being arranged between the first part and the second part, the second part being arranged between the third part and the fourth part; and a separator configured to separate one of a first drive waveform signal indicating the first drive waveform and a second drive waveform signal indicating the second drive waveform from the time-division multiplexed signal, and wherein the energy generating element is configured to be driven by one of the first drive waveform signal and the second drive waveform signal, the first drive waveform signal being a signal separated by the separator by a first pulse signal having a period shorter than a period of the first part and a second pulse signal having a period shorter than a period of the second part, the second drive waveform signal being a signal separated by the separator by a third pulse signal having a period shorter than a period of the third part and a fourth pulse signal having a period shorter than a period of the fourth part, wherein each of the first data and the second data includes a plurality of quantized data values, wherein the signal generator includes:

a controller;

a digital-to-analog converter configured to convert the plurality of quantized data values to an analog signal;

an amplifier configured to amplify the analog signal; and a memory configured to store the first data and the second data, wherein the controller is configured to generate the time-division multiplexed signal by reading the plurality of quantized data values of the first data and the second data from the memory and transmitting the plurality of quantized data values in a time series, wherein the digital-to-analog converter is further configured to output the analog signal to the amplifier, wherein the amplifier is further configured to output the amplified analog signal to the separator, and wherein the separator is configured to separate one of the first drive waveform signal and the second drive waveform signal from the amplified analog signal.

2. The printing device according to claim 1, wherein:

an ON state of the first pulse signal starts when a delay time has elapsed from a point of time when the first part starts to turn on;

an ON state of the second pulse signal starts when the delay time has elapsed from a point of time when the second part starts to turn on;

an ON state of the third pulse signal starts when the delay time has elapsed from a point of time when the third part starts to turn on; or an ON state of the fourth pulse signal starts when the delay time has elapsed from a point of time when the fourth part starts to turn on.

3. The printing device according to claim 2, further comprising a storage, wherein the delay time is stored in the storage in advance.

4. The printing device according to claim 2, wherein the separator is configured to obtain the delay time before the printing device starts printing.

5. The printing device according to claim 2, wherein the controller is configured to output a digital signal of a non-ejection waveform not for ejecting the liquid from the nozzle, wherein the digital-to-analog converter is configured to convert the digital signal of the non-ejection waveform output from the controller to analog signal and output the analog signal, and wherein the printing device further comprises an obtaining circuit configured to determine a time period from a time at which the analog signal output from the digital-to-analog converter starts to turn on and until a time at which a voltage value of the analog signal reaches a threshold value, and obtain the delay time.

6. The printing device according to claim 5, wherein the separator includes a separation switch, the time-division multiplexed signal being input to the separation switch, and wherein the separator is configured to separate an analog signal of the non-ejection waveform from the time-division multiplexed signal by opening or closing the separation switch when the obtaining circuit obtains the delay time.

7. The printing device according to claim 2, wherein the printing device further comprises an obtaining circuit configured to obtain the delay time from a time at which the analog signal output from the digital-to-analog converter start to turn on until a time at which a voltage value of the analog signal reach a threshold value.

8. The printing device according to claim 7, wherein the separator includes a separation switch, the time-division multiplexed signal being to be input to the separation switch, and wherein the separator is configured to open the separation switch during the delay time.

9. The printing device according to claim 8, wherein the obtaining circuit is configured to obtain the delay time after the printing device is powered on and before the printing device starts a flushing process of ejecting a liquid from the nozzle.

10. The printing device according to claim 7, wherein the separator includes a separation switch, the time-division multiplexed signal being input to the separation switch, and wherein the separator is configured to separate one of the first drive waveform signal and the second drive waveform signal from the time-division multiplexed signal by opening or closing the separation switch when the obtaining circuit obtains the delay time.

11. The printing device according to claim 7, wherein the obtaining circuit is included in the separator.

12. The printing device according to claim 7, wherein the obtaining circuit is included in the controller.

13. The printing device according to claim 12, wherein the controller is configured to generate and output the first pulse signal, the second pulse signal, the third pulse signal and the fourth pulse signal based on the delay time obtained by the obtaining circuit.

14. The printing device according to claim 7, wherein the obtaining circuit includes a clip circuit and a detection circuit, the analog signal output from the digital-to-analog converter being input to the clip circuit, the clip circuit being configured to output the analog signal within a particular voltage range, the detection circuit being configured to detect the analog signal output from the clip circuit and measure a time when a voltage value of the analog signal reaches the threshold value, and wherein the detection circuit is included in the controller.

15. The printing device according to claim 7, wherein the obtaining circuit is configured to obtain the delay time using the amplified analog signal.

16. The printing device according to claim 7, further comprising a head unit including the nozzle, wherein the obtaining circuit is arranged at the head unit.

17. The printing device according to claim 7, further comprising a head unit including the nozzle, and a carriage configured to move the head unit, wherein the obtaining circuit is arranged on the carriage.

18. The printing device according to claim 7, wherein the amplifier of the signal generator includes:

a first amplifier configured to amplify the analog signal;

a second amplifier different from the first amplifier;

a first switch connected to the first amplifier; and a second switch connected to the second amplifier, and wherein the obtaining circuit is configured to obtain the delay time using the analog signal which is one of an analog signal after output from the first amplifier and before input to the first switch and an analog signal after output from the second amplifier and before input to the second switch.

19. The printing device according to claim 18, wherein the analog signal includes a first analog signal and a second analog signal, the first analog signal being a signal output from the first amplifier and input to the first switch, the second analog signal being a signal output from the second amplifier and input to the second switch, wherein the delay time includes a first delay time and a second delay time, and wherein the obtaining circuit is configured to obtain the first delay time with using the first analog signal and obtain the second delay time with using the second analog signal.

20. The printing device according to claim 2, wherein the delay time includes a delay time occurring in the digital-to-analog converter, a delay time occurring in the amplifier, and a delay time occurring in a transmission path from the amplifier to the separator.

21. The printing device according to claim 20, wherein the delay time includes time due to a transient response occurring in the amplifier.

22. The printing device according to claim 20, wherein:

a point of time when the ON state of the first pulse signal ends is later than a start point of a period of the third part;

a point of time when the ON state of the third pulse signal ends is later than a start point of a period of the second part; or a point of time when the ON state of the second pulse signal ends is later than a start point of a period of the fourth part.

23. The printing device according to claim 20, further comprising a head unit including a plurality of the nozzles, wherein:

a point of time when the ON state of the first pulse signal starts and an ON duration of the first pulse signal are changed in accordance with a number of the plurality of the nozzles driven;

a point of time when the ON state of the second pulse signal starts and an ON duration of the second pulse signal are changed in accordance with a number of the plurality of the nozzles driven;

a point of time when the ON state of the third pulse signal starts and an ON duration of the third pulse signal are changed in accordance with a number of the plurality of the nozzles driven; or a point of time when the ON state of the fourth pulse signal starts and an ON duration of the fourth pulse signal are changed in accordance with a number of the plurality of the nozzles driven.

24. The printing device according to claim 20, wherein:

a point of time when the ON state of the first pulse signal starts and an ON duration of the first pulse signal are changed in accordance with an amplitude of the first part;

a point of time when the ON state of the second pulse signal starts and an ON duration of the second pulse signal are changed in accordance with an amplitude of the second part;

a point of time when the ON state of the third pulse signal starts and an ON duration of the third pulse signal are changed in accordance with an amplitude of the third part; or a point of time when the ON state of the fourth pulse signal starts and an ON duration of the fourth pulse signal are changed in accordance with an amplitude of the fourth part.

25. The printing device according to claim 24, wherein:

the ON duration of the first pulse signal becomes shorter as the amplitude of the first part increases;

the ON duration of the second pulse signal becomes shorter as the amplitude of the second part increases;

the ON duration of the third pulse signal becomes shorter as the amplitude of the third part increases; or the ON duration of the fourth pulse signal becomes shorter as the amplitude of the fourth part increases.

* * * * *